(12) United States Patent
Dutta et al.

(10) Patent No.: US 9,373,197 B2
(45) Date of Patent: Jun. 21, 2016

(54) METHODS AND SYSTEMS FOR ELECTRONIC PAYMENT FOR ON-STREET PARKING

(71) Applicant: Transparent Wireless Systems, LLC, Vienna, VA (US)

(72) Inventors: Santanu Dutta, Vienna, VA (US); Nils Rydbeck, Summerland Key, FL (US)

(73) Assignee: TRANSPARENT WIRELESS SYSTEMS, LLC, Vienna, VA (US)

( * ) Notice: Subject to any disclaimer, the term of this patent is extended or adjusted under 35 U.S.C. 154(b) by 0 days.

(21) Appl. No.: 14/800,355

(22) Filed: Jul. 15, 2015

(65) Prior Publication Data

US 2015/0317840 A1    Nov. 5, 2015

Related U.S. Application Data

(63) Continuation of application No. 14/482,369, filed on Sep. 10, 2014, which is a continuation-in-part of application No. 13/862,619, filed on Apr. 15, 2013, now Pat. No. 9,123,034.

(Continued)

(51) Int. Cl.
*G06Q 10/00* (2012.01)
*G07B 15/00* (2011.01)
*G06Q 50/30* (2012.01)
(Continued)

(52) U.S. Cl.
CPC .............. *G07B 15/00* (2013.01); *G06Q 20/145* (2013.01); *G06Q 20/322* (2013.01); *G06Q 20/3224* (2013.01); *G06Q 20/3278* (2013.01); *G06Q 50/30* (2013.01); *G07B 15/02* (2013.01); *G07F 17/246* (2013.01)

(58) Field of Classification Search
CPC ... G06Q 20/3224; G07F 17/246; G07B 15/02
See application file for complete search history.

(56) References Cited

U.S. PATENT DOCUMENTS

| | | |
|---|---|---|
| 5,928,309 A | 7/1999 | Korver et al. |
| 6,081,206 A | 6/2000 | Kielland |

(Continued)

OTHER PUBLICATIONS

Letter from Deeth Williams Wall, LLP; dated Jan. 5, 2015.

(Continued)

*Primary Examiner* — Allen J Jung
(74) *Attorney, Agent, or Firm* — The Marbury Law Group, PLLC

(57) ABSTRACT

This disclosure describes a method of payment for parking of a vehicle including determining the location of the vehicle with a wireless communication device. Determining the location includes using a satellite radio navigation system such as GPS with the facility for user provided corrections and avoiding the use of zone IDs. The method also includes automatically extending an initiated parking session with subsequent prepaid time durations until certain predetermined conditions are met. The method includes automatically determining the end of an initiated parking session based on detecting movement of the vehicle away from a parking spot provided the Handset containing the parking payment App has sensed a Bluetooth tag in the vehicle or paired with the built-in Bluetooth system of the vehicle. The method also includes targeted parking enforcement where parked vehicles are identified wirelessly by short range radio beacons emitted by tags placed in/on the vehicles and their session status checked with information downloaded from a parking application server.

15 Claims, 24 Drawing Sheets

Street Parking Screens: Start Parking

Related U.S. Application Data

(60) Provisional application No. 61/687,333, filed on Apr. 23, 2012, provisional application No. 61/880,001, filed on Sep. 19, 2013, provisional application No. 61/888,793, filed on Oct. 9, 2013, provisional application No. 61/970,161, filed on Mar. 25, 2014.

(51) Int. Cl.
  *G06Q 20/14* (2012.01)
  *G06Q 20/32* (2012.01)
  *G07F 17/24* (2006.01)
  *G07B 15/02* (2011.01)

(56) References Cited

U.S. PATENT DOCUMENTS

| | | | |
|---|---|---|---|
| 6,081,230 A | 6/2000 | Hoshino et al. | |
| 7,188,070 B2 | 3/2007 | Dar et al. | |
| 7,215,255 B2 | 5/2007 | Grush | |
| 7,908,149 B2 | 3/2011 | Dar et al. | |
| 8,131,596 B2 | 3/2012 | McQuilken | |
| 8,140,265 B2 | 3/2012 | Grush | |
| 8,175,886 B2 | 5/2012 | Odinak | |
| 2003/0146852 A1* | 8/2003 | O'Dell | G07B 15/02 340/932.2 |
| 2005/0286421 A1 | 12/2005 | Janacek | |
| 2007/0016362 A1* | 1/2007 | Nelson | G01C 21/362 701/425 |
| 2008/0117100 A1 | 5/2008 | Wang et al. | |
| 2009/0292597 A1 | 11/2009 | Schwartz et al. | |
| 2011/0153367 A1* | 6/2011 | Amigo | G07C 5/008 705/4 |
| 2012/0130777 A1 | 5/2012 | Kaufman | |
| 2012/0308077 A1 | 12/2012 | Tseng | |
| 2014/0236686 A1 | 8/2014 | Grush et al. | |

OTHER PUBLICATIONS http://www.verrus.com/default.asp?ctState=prHow, Wireless Parking Payment, Apr. 10, 2013, webpage, 1pg.

http://us.parkmobile.com/members/, Mobile Payment Parking Solutions, Apr. 11, 2013, webpage, 1pg.

http://sfpark.org/, Apr. 11, 2013, 3pgs.

http://www.indiegogo.com/projects/sticknfind-bluetooth-powered-ultra-small-location-stickers, Ultra small sticker with Blue Tooth low energy, Apr. 11, 2013, 18pgs.

International Standard, ISO/IEC 18000-6, "Information Technology—Radio Frequency Identification for Item Management," First Edition, Aug. 15, 2004, copyright ISO/IEC 2004, 144pgs.

\* cited by examiner

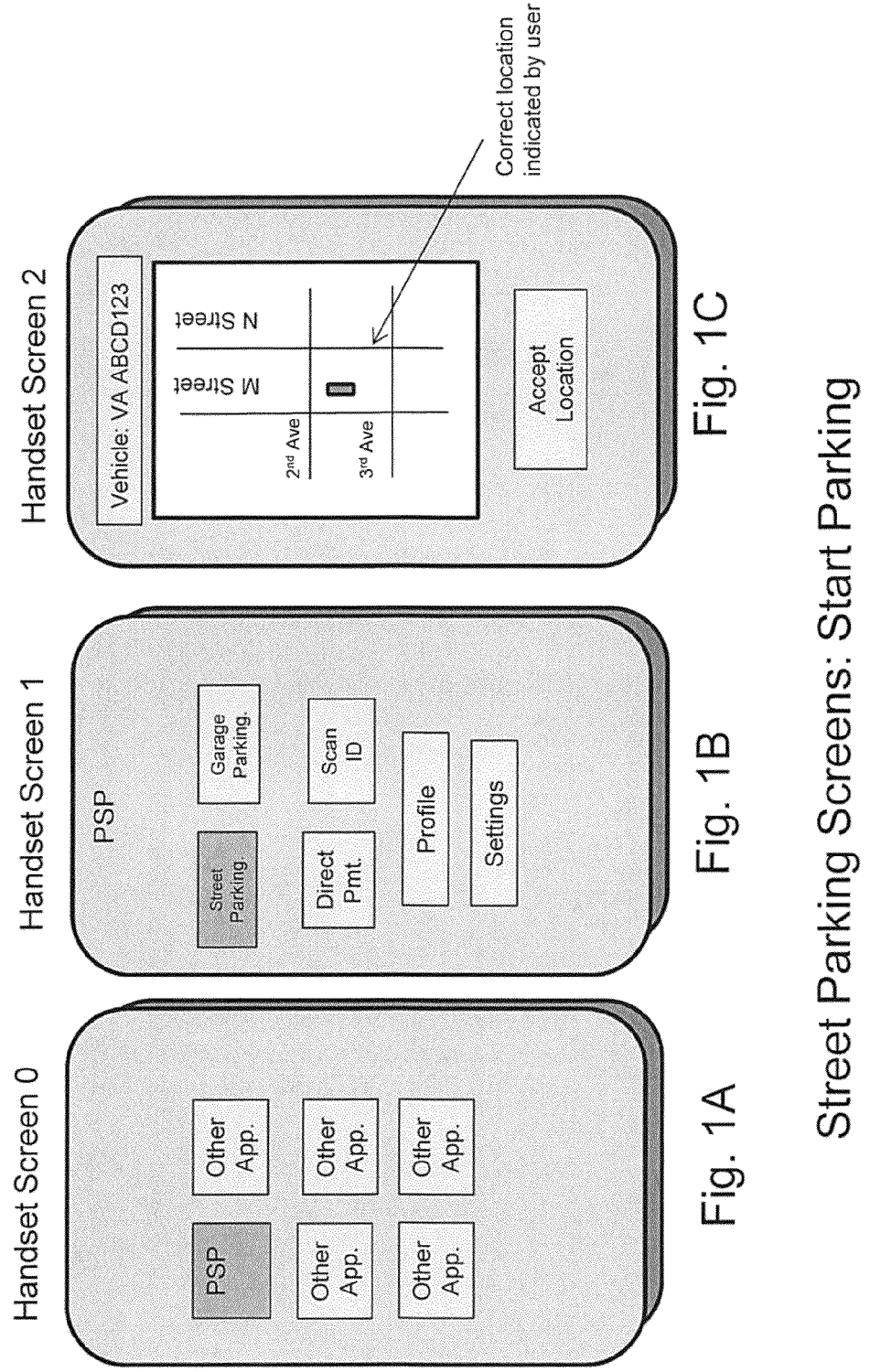

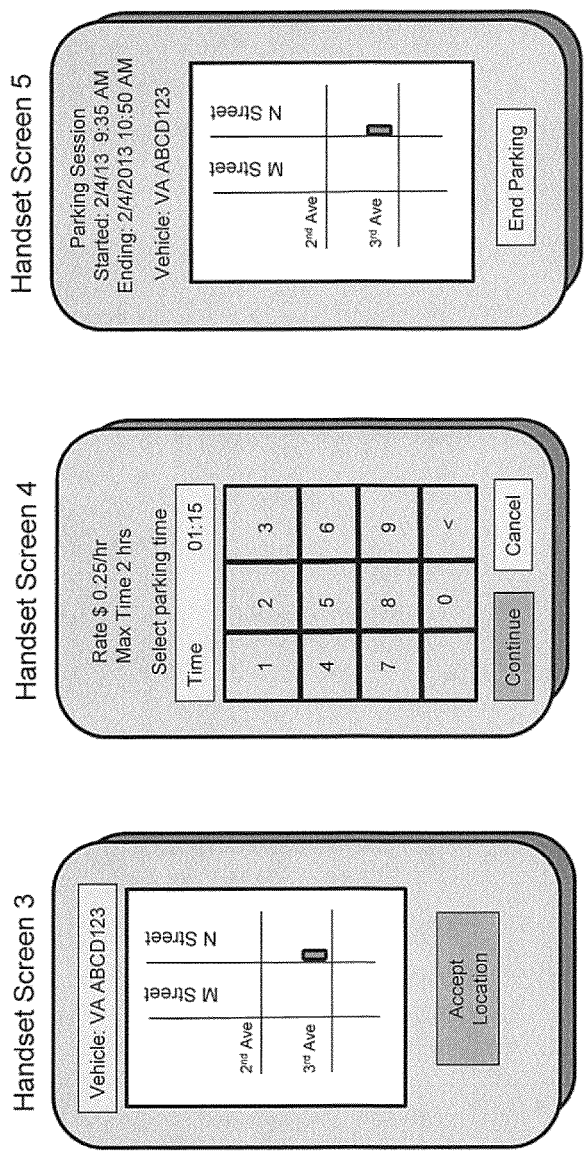

Street Parking Screens: End Parking

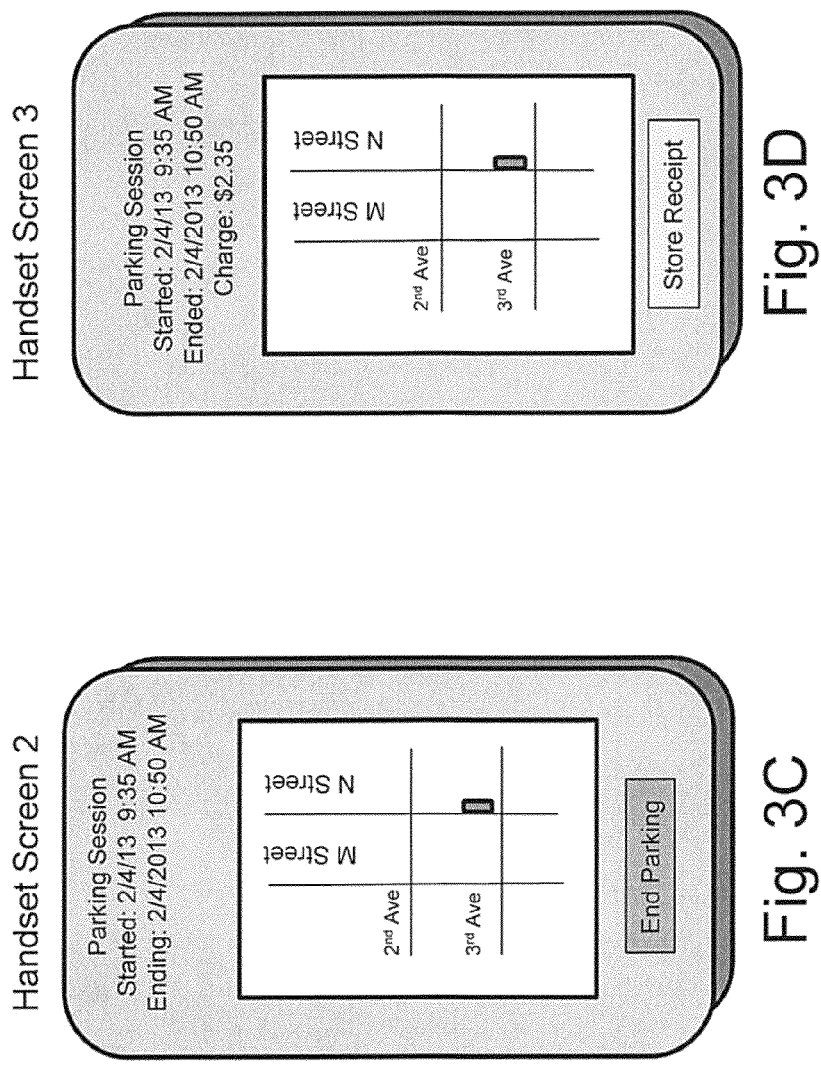

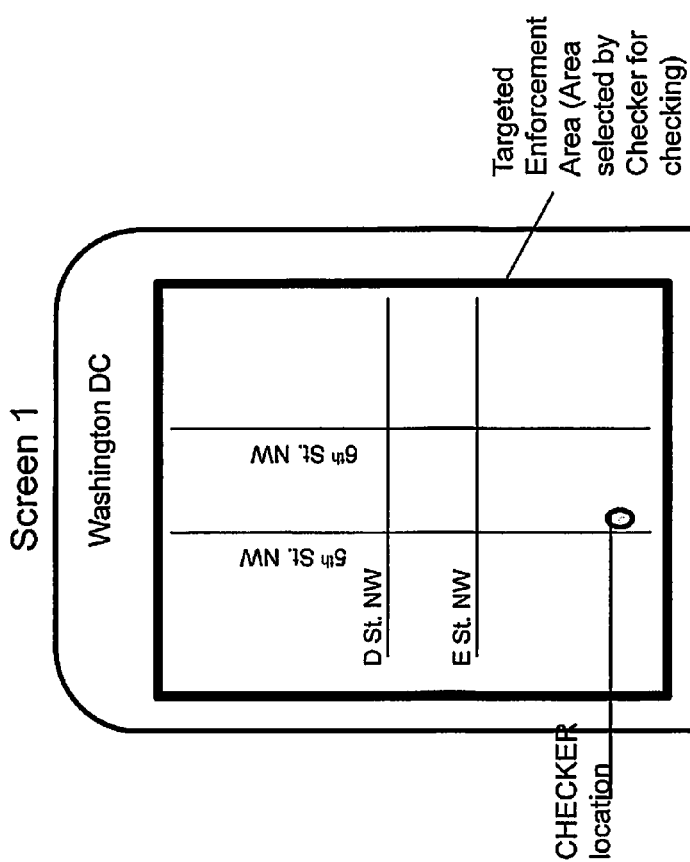

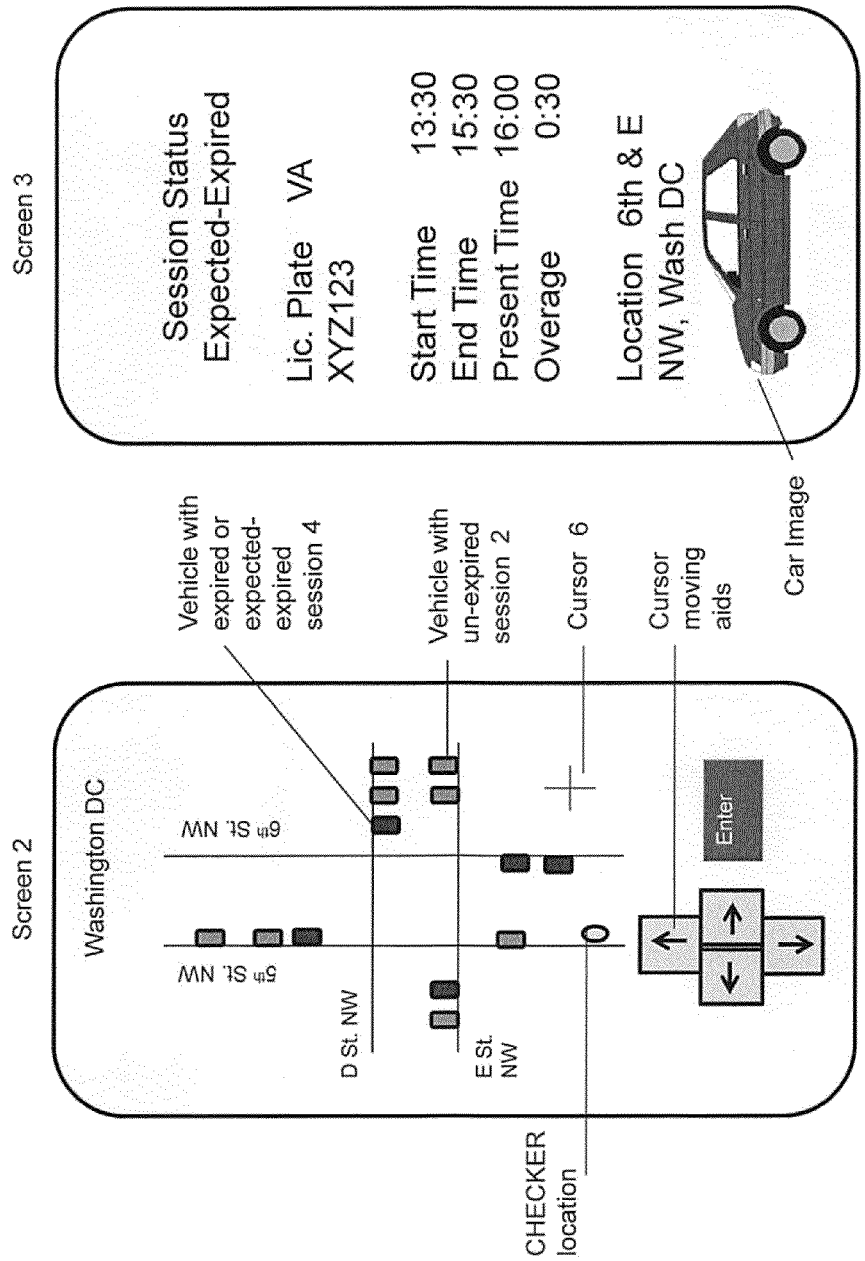

Fig. 7 Walk-around Validation using Short Range Beacon Signal

Steps in Vehicle Recognition: Optical Scanning

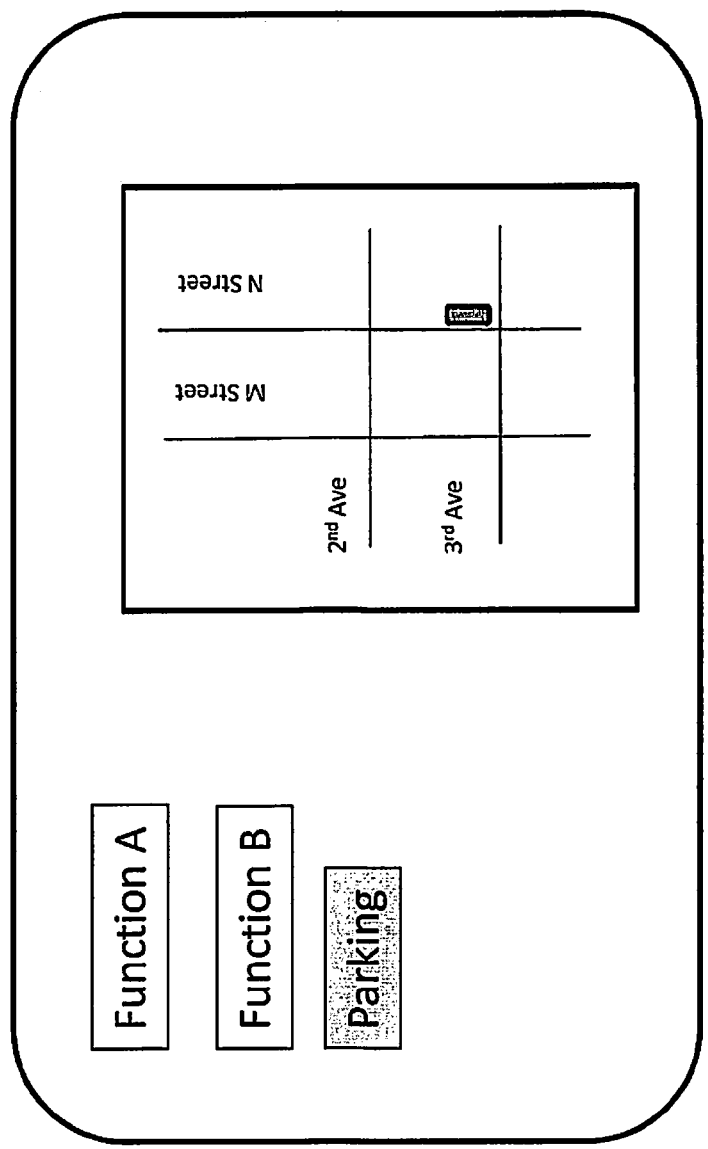

METHODS AND SYSTEMS FOR ELECTRONIC PAYMENT FOR ON-STREET PARKING

RELATED APPLICATIONS

This application is a continuation of U.S. patent application Ser. No. 14/482,369, filed Sep. 10, 2014, which is a continuation-in-part of U.S. patent application Ser. No. 13/862,619, filed Apr. 15, 2013, which claims the benefit of U.S. Provisional Application Ser. No. 61/687,333, filed Apr. 23, 2012, hereby incorporated by reference in their entireties. This application also claims the benefit of U.S. Provisional Application Ser. No. 61/880,001, filed Sep. 19, 2013, U.S. Provisional Application Ser. No. 61/888,793, filed Oct. 9, 2013 and U.S. Provisional Application Ser. No. 61/970,161, filed Mar. 25, 2014, hereby incorporated by reference in their entireties.

FIELD OF INVENTION

The invention relates to the fields of wireless mobile commerce, cashless parking and wireless payment for parking, including on-street parking.

BACKGROUND

Any parking system consists of the following main features: (a) authorization—a method of seeking permission to park by the user and by the Parking Authority to grant authorization; (b) payment—a method of collecting payment from the user; (c) validation—a method of checking whether the authorized time has run out or the vehicle was never authorized; (d) enforcement—a method used by the parking authority for penalizing vehicles that have not paid or have overstayed their authorized time. The term, "targeted enforcement" refers to enforcement that is selectively targeted at a subset of the general population of vehicles.

These requirements are fundamental—they are present in legacy systems and continue to be requirements for new systems. Modern systems and methods are using wireless technologies to improve consumer experience and reduce the cost of providing service while still meeting the above requirements. Some examples of prior art methods are described below.

Open, Roadside, Coin Operated Parking Meters

A mechanical device, known as a parking meter, is permanently mounted on the sidewalk and associated with a particular marked parking space on the street. The user (person wishing to occupy a parking space) inserts coins of denominations usually specified on the parking meter into a slot in the meter. The total value of the coins inserted corresponds to an authorized parking duration, which is displayed by the meter. As time elapses, a clockwork mechanism in the meter reduces the authorized time until the latter is completely exhausted. Thereupon, a prominent sign (often a red flag) that the authorized time has expired is displayed. If a vehicle is parked in a spot where the meter has run out, it is liable to be penalized by the parking authority, often by being given a paper ticket. Human collectors periodically collect the coins deposited in the meters.

Open-Access Parking Lots with Payment Kiosks

More recently, owing to the difficulty of maintenance and payment collection, coin operated parking meters are being replaced with multi-space payment kiosks. A kiosk may serve a large number of open-access (i.e. non-gated) numbered or un-numbered parking spaces. The user parks his vehicle in an available space, enters his space-number (if the parking spaces are numbered) on the operating console of the kiosk and requests to occupy the specified space for a specified time period. The kiosk issues a paper ticket, or token, containing the space-number and the authorized time, sometimes by specifying the time of day when the token expires. If the parking spaces are un-numbered, the ticket does not contain a space-number field. The user is required to display the ticket prominently so that parking authority agents may inspect vehicles for enforcement.

Payment by Wireless

In the past several years, a number of wireless payment systems have been introduced to replace the coin operated meter and the payment kiosks described in the previous sections. In most cases, a cellphone, or Handset, is involved and the systems are generally referred to as, "pay by cell." This has been facilitated by the fact that modern cellphones (Handsets) can engage in payment transactions with a remote server either via commonly available cellular data services or through automated voice activated systems. The Verrus™ system is an example of prior art use of wireless means for parking authorization and payment.

In the Verrus™ system, the user's credentials, such as mobile phone number, vehicle license plate number, credit card number and other information are required to be pre-registered with Verrus™. Once registered, the user can park his vehicle in parking lots with which Verrus™ has established a business arrangement to allow its method of remote payment. The following are prominently displayed in the lot: (a) the fact that this is a Verrus™ authorized parking lot and (b) a parking lot ID number. The user sends an SMS or makes a phone call to communicate the parking lot ID and her requested parking duration. Parking authority agents (Checkers) can verify the authorization status of parked vehicles by accessing the Verrus™ server, which is remotely accessible to the Checker.

Other similar systems have also been deployed in many major cities. For example, a cashless parking system has been developed by Parkmobile® and deployed in several states in the United States. As in the Verrus™ system, the user has a prearranged payment agreement with Parkmobile®, which is the Parking Service Provider. In order to initiate a parking session, the user has to communicate a Parking Zone ID to a Parkmobile® server via his mobile phone. This communication can occur by calling a phone number or entering data on the user's mobile phone as part of executing a downloaded mobile application. The method of enforcement is based on a Checker determining the compliance status of each individual vehicle (with respect to the duration of stay and the paid parking fee) using a handheld Checking Terminal to access the Parking Application Server.

Although remote wireless payment systems and methods in support of parking applications are burgeoning in the prior art, these systems currently offer suboptimal user and Checker experiences. Some examples are provided below.

In the prior art systems, requesting parking authorization requires the user to perform one or more of the following operations: (a) make a phone call and verbally communicate various information, including the Parking Zone ID; (b) manually send an SMS with the above information; (c) find and read the zone ID applicable to given parking spot, launch an application on a smart phone and enter data in response to a query from the application. Performing these operations while parked on a busy and noisy street is inconvenient and potentially risky.

Both user and Checker experiences are significantly improved in the present invention. The Checker's job has actually been made more difficult in some prior art wireless parking payment systems. For example, in the Parkmobile® system, vehicle's belonging to Parkmobile® customers are parked beside other vehicles with no features distinguishing the Parkmobile® vehicles. A vehicle of the latter type may be parked in front of a legacy coin meter with an indication of expired session (e.g. a red flag). For every vehicle so parked, the Checker has to first ascertain if it is a Parkmobile® vehicle before he can issue a fine (ticket). This ascertaining may be performed by the Checker manually entering the license plate number of the vehicle on to a handheld Checking Terminal connected wirelessly to a Parkmobile® server and the server responding with a message stating whether the vehicle is a Parkmobile® customer's vehicle with an expired session. The task may be slightly lightened by the license plate being scanned and uploaded to the server electronically. Nevertheless, it is noteworthy that, even if a single Parkmobile® vehicle is present among ten other vehicles which are not Parkmobile® vehicles, the Checker has to perform the above process for each one of the eleven vehicles. Before the Parkmobile® system was introduced, the Checker could issue tickets purely based on the indicated status of the coin meter.

It is further noteworthy that, as present pay by cell systems do not indicate the parked locations of their vehicles with a spatial resolution better than a city block (a city block is the range typically covered by a Zone ID in the Parkmobile® system and Zone ID is the highest resolution of vehicle location information available in that system), the Checker has to do a considerable amount of "hunting" to find the approximate locations of vehicles participating in these systems. As explained above, when these vehicles are intermingled with legacy vehicles (not participating in the pay by cell system), it greatly increases the workload of the Checker.

SUMMARY OF THE INVENTION

Embodiments are drawn to methods and systems of payment for parking of a vehicle including determining the location of the vehicle with a wireless communication device. Determining the location includes using a satellite navigation system such as GPS and, additionally, allows the user to make corrections to the indicated position if desired. The method also includes initiating a parking session having a first prepaid time duration with the server and transmitting the location of the wireless communication device and an identity of the vehicle to the server. The method also includes automatically extending the parking session with subsequent prepaid time durations until at least one of the following conditions is reached: the user closes the parking session, a maximum parking session is reached, a free parking period begins or the parking session closes on detection of movement of the vehicle away from a parking spot.

In embodiments of the present invention, the location is automatically sensed by a User Platform, which may be a cellular Handset or equivalent functionality built into a vehicle, the platform using a positioning technology, such as the Global Positioning System (GPS). This location estimate may be augmented by other positioning technologies, such as those using known locations of WiFi access point, locations of cellular base stations and, in the case where the parking application is built into the electronic system of the vehicle, on-board motion sensors, like inertial navigation systems.

Basic Principles of Operation

An embodiment relates to a system of payment for parking of a vehicle including a wireless communication device including a positioning module configured to determine a location of the wireless communication device, a transceiver configured to communicate with a server, a processor operably connected to the positioning module and the transceiver. The processor is configured to determine the location of the wireless device, initiate a parking session with the server and transmit the location of the wireless communication device and an ID of the vehicle or the user to the server and allow a user to provide corrections to the location determined by positioning module.

User Correction of Indicated Position

It is well known that, in dense urban canyons, satellite navigation, such as GPS, often provides relatively large position errors owing to limited satellite visibility and multipath propagation. This was recognized in U.S. Pat. Nos. 7,215,255 and 8,140,265, where complex filtering methods were proposed to improve the accuracy; nevertheless, it was admitted that, in spite of such filtering, dependence on motion sensors might be necessary to improve the accuracy. In the present invention, user inputs are used to correct the indicated position. The user input may be realized though several embodiments.

In one embodiment of user provided correction, a User Platform indicates an estimated position on an electronic map, which position may be corrected by the user based on an awareness of his whereabouts. As in prior art navigation systems, currently available in Handsets and vehicles, the user may be aided by the map displaying prominent landmarks and street names. The user may correct the User Platform-indicated position by selecting a position on the displayed map different from the indicated position. The inputting of an alternate position may be performed by the user touching a touch sensitive display screen, using technologies known in the prior art.

Automatic Sensing by a Handset of a Vehicle's ID

When the User Platform is a Handset, as opposed to similar electronics built into the car, it is clear that it may be used with different vehicles at different times. In prior art systems, such as Parkmobile®, the user is required to enter the license plate number of the vehicle that is to be associated with a given Handset, whose ID is known to the Parking Application Server (shortcuts such as defaulting to the last used vehicle or selecting one of a list of stored vehicle IDs are also supported). In an embodiment, the vehicle associated with a Handset is determined automatically by enabling the Handset to sense the vehicle's ID with an identification device located in/on the vehicle and causing this identification device to trigger a software application (App) in the Handset. The App reads the vehicle ID transmitted by the identification device and stores it in the Handset's memory. The stored vehicle ID is used in parking applications executed on the Handset and remains the default vehicle ID until and unless it is overwritten by another act of automatic sensing by the Handset of vehicle ID or an act of manual override to the automatically sensed vehicle ID.

Various methods of vehicle ID sensing are possible, including but not limited to the following: optical scanning of a bar code, including QR code; RFID interrogation of an RFID tag located in/on the vehicle; Bluetooth® transaction performed with a Bluetooth device located in/on the vehicle, the Bluetooth® device ID being associated with the vehicle ID.

An embodiment relates to a system to determine the identity of a vehicle by a wireless communications device located in vehicle, using a separate identification device also located in the vehicle. The wireless communication device is able to sense a beacon signal emitted by the identification device with a sensor or receiver in the wireless communication device. The wireless communications device includes a transceiver configured to communicate with a server and a processor. The processor is configured to sense an identity of the vehicle from the identification device and communicate the identity to the server. The beacon signal may comprise a Bluetooth® Low Energy (BLE) signal.

Automatic Ending of an Active Parking Session

It is preferable for the Parking Application Server to know when a parking session has ended. The termination time of the parking session determines the expired/unexpired status of the session, making the user potentially liable for fines if the session has expired. Furthermore, knowledge of the time-overage (the time by which the user has overstayed the parking session) may be used by a parking authority to graduate the fine (e.g. smaller fines for smaller overages). In some markets, by Parking Authority policy, the user is required to buy a predetermined amount of session time at the onset of the session. In such markets, some legacy systems, such as Parkmobile®, provide no provision for the user to end an active parking session, although such provision is made in other markets where the Parking Authority policy allows the user to pay for the actual duration of stay. In the present system, regardless of whether the user is required to buy a predetermined amount of session time or pay for actually consumed session time, the user is allowed (and incentivized) to close the session as this unambiguously determines the session status (expired or unexpired) of all parked vehicles belonging to the present system. In case the user forgets to close the session, the present system is able to automatically determine that the session has ended, that is, the user has moved the vehicle from the parked location, as described below.

When the position location function, or module, is always physically tied to the vehicle, as in the case where the parking application is run on the vehicle's electronic system, the ending of a session may be determined without user cooperation by monitoring (i) the location indicated by the vehicle's position location subsystem and (ii) the time rate of change of the indicated location. If both (i) and (ii) show changes greater than appropriately chosen threshold values, it may be concluded that the vehicle has left its parked spot. Examples of threshold values may be 20-200 m, such as 50-150 m, such as 100 m and 6-20 km/hour, such as 10-15 km/hour but other values may be used without departing from the teachings of this invention. In an embodiment, both location and speed may be used to determine if the vehicle has moved as limited satellite visibility and multipath in dense urban canyons can cause the indicated position to wander slowly around an indicated mean position.

When the position location function, e.g. GPS, is part of a portable wireless communications device, such as a Handset, carried by the user, the above determination may be more difficult. This is because the user leaving the vehicle and walking away might trigger a similar response from the GPS as when the vehicle is moved. In the present embodiment of the system, this problem is solved by making a determination that the user is in the vehicle as a precondition for automatically declaring session closure. The determination that the user is in the vehicle is made by the Handset checking that a wireless beacon emitted by an identification device located in/on the vehicle can be sensed by the Handset. That is, the power of the signal received from the identification device is above a threshold value. The above identification device may be the same device that is used for identifying the vehicle to the Handset, as described above.

When the Handset automatically closes a parking session, an advisory alerting message may be sent to the user and the Parking Application Server to distinguish this type of session closure from one initiated by the user.

Facile and Rapid Checking Experience

As described in the Background section above, the Checker's experience has deteriorated with the recently introduced pay by cell systems. Embodiments described herein improve the checking experience. This is done by the means described below.

Real time access to vehicle attributes and *facile* presentation thereof: The Checker is provided with a handheld Checking Terminal, which is wirelessly connected, such as via a cellular data link, to the Parking Application Server. The Terminal may be also equipped with the following capabilities: position location ability based on a technology such as GPS, display, software applications. In one embodiment, the Checker determines an area to be surveyed for targeted enforcement (parking session validation and fine ticket issuance). This targeted area is uploaded by the user, using the Checking Terminal, to the Parking Application Server. In response, the Server downloads the list and attributes of all vehicles that are registered with the Server and located in the targeted area. This list may be displayed with symbols, such as green and red dots, on a map on the Checking Terminal, together with the position of the Terminal, the green dots indicating the locations of vehicles with unexpired sessions and the red dots indicating the locations of vehicles with expired sessions.

The method/system of accessing real time vehicle attribute data, and presenting the data to the Checker in a manner facilitating rapid checking of parked vehicles, may be used in conjunction with other systems, including legacy systems, regardless of the means used to track the locations of parked vehicles. The vehicle locations may be known with less accuracy than in the system of the present invention but the teachings thereof may still be applicable to improve the Checker experience. Other symbols (e.g. squares, triangles, diamonds, etc.) and colors (e.g. blue, yellow, orange, etc.) and their combination may be used.

Rapid wireless determination of vehicle ID for Session Status Checking using RF Query/Response: In an embodiment, all vehicles participating in the system of this invention have in/on them a short range RF transponder, referred to as a tag, which is capable of responding with its identity (ID) and other information to a query using the same RF technology. One example of such a query-response RF technology is RFID but the methods taught herein may be used with other wireless transponder technologies. The tag described above may be obtained separately from the vehicle but kept in or on it, similar to present highway toll collection tags/transponders. The tag function used to support parking operations may also be built into, and combined with, a high toll collection function, thereby creating a multi-function tag. As an alternative embodiment, the tag function necessary to support parking operations may also be built into the vehicle's electronic system.

In an embodiment of the present system, the Checker performs session validation (targeted enforcement) as follows. In the vicinity of the parked vehicles, within the coverage range of the wireless technology, the Checking Terminal (either under user control or autonomously) issues a set of queries, in response to which all vehicles within coverage range respond with their IDs and other information. As described above, the Checking Terminal has received from the Parking Application Server, a downloaded file containing the IDs and session status of all vehicles in the targeted area. The file may also contain one or more attributes of the vehicles that may facilitate recognition, such as some combination of license plate number, physical description of the vehicle and an image of the vehicle. The Checking Terminal software compares the wireless responses from the parked vehicles with the expired vehicle data in the downloaded file and identifies the vehicles with expired vehicle sessions. In alternative embodiments, less than all of the vehicles in the coverage area are queried.

In some embodiments, the Checker may issue wireless queries from a slowly moving vehicle without leaving the vehicle—this is referred to as drive-by checking.

An embodiment relates to a system of identification of vehicles with an expired parking status including a wireless identification tag in or on a parked vehicle and a portable Checking Terminal capable of wirelessly reading the wireless identification tag. The portable Checking Terminal is configured to receive information associated with a parked vehicle from a server and the portable checking terminal wirelessly interrogates the wireless identification tags in or on the parked vehicle to identify the parked vehicles with expired parking sessions.

Rapid wireless determination of vehicle ID for Sessions Status Checking using RF Beacon located in/on the vehicle: In another embodiment of the present system, the Checker's Terminal may receive beacon signals emitted by identification devices placed in/on the vehicles when the Checker is within coverage range of the identification devices, without issuing queries to the identification devices. As in the case of RFID based vehicle identification described above, the beacon signals also allow the Checker's Terminal to identify the vehicles. The process of comparing the wirelessly sensed vehicle IDs with vehicle information downloaded from the Parking Application Server, and thereby identifying vehicles with expired sessions, is similar in both methods, that is, methods using RFID queries and beacons.

The identification devices used for sessions status checking using beacons, described above, may be the same device as used for identifying the vehicle to the Handset and for automatic session closure.

Integration of the User Platform into the Electronic System of a Vehicle

Another embodiment relates to a system of payment for parking in open streets using one or more functional subsystems built into the electronic system of a vehicle including a wireless data modem, or User Platform, configured to communicate with a server, a parking application software loaded into an electronic system of the vehicle, a positioning subsystem configured to use a satellite navigation technology and an inertial navigation technology. The positioning subsystem can automatically sense the vehicle's location and the parking application is configured to send a location and a vehicle identity or user identity to the server as inputs for starting a parking session.

BRIEF DESCRIPTION OF THE DRAWINGS

FIGS. 1A-1F show exemplary Handset screens for a use case corresponding to initiation of parking, referred to as "Start Parking," in open streets.

FIGS. 3A-3D show exemplary Handset screens for a use case corresponding to the termination of parking, referred to as "End Parking," in open streets.

FIGS. 5A-5C show exemplary Checking Terminal screens according to the methods/systems of session validation, or checking, or targeted enforcement described in the present invention.

FIGS. 11A-11C show examples of a vehicular display screen for End Parking in open streets when the User Platform is integrated into the vehicle's electronic system.

DETAILED DESCRIPTION

Figure 2:
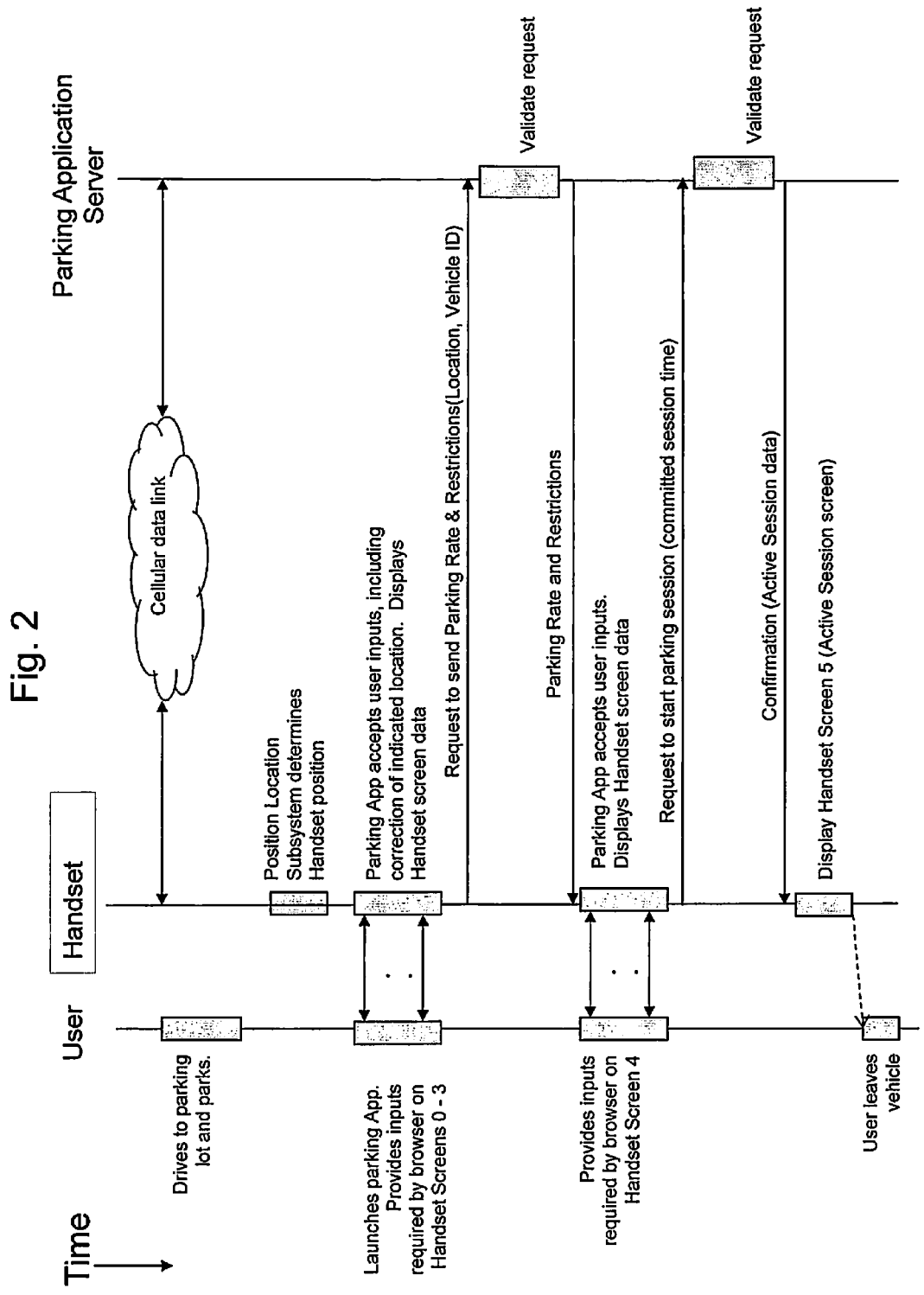
FIG. 2 shows a time-domain transaction ladder diagram corresponding to the use case of FIGS. 1A-1F.
Figures 3A, 3B:
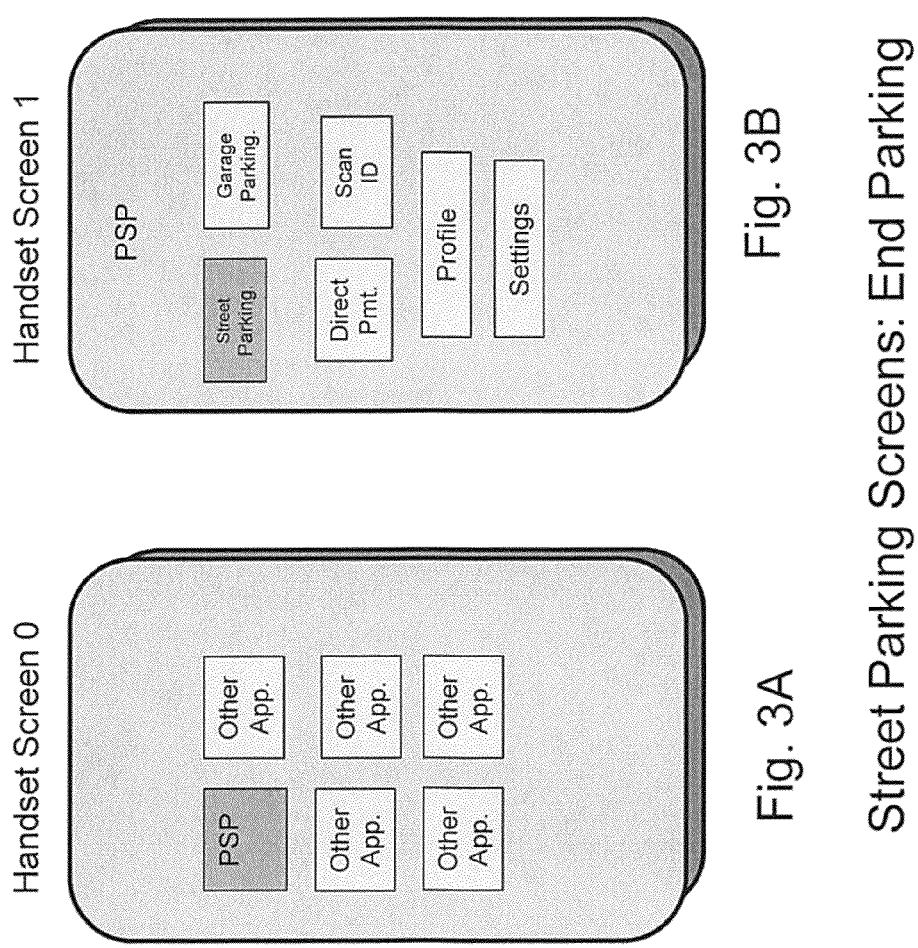

The present invention will now be described more fully hereinafter with reference to the accompanying drawings, in which typical embodiments of the invention are shown. This invention may, however, be embodied in many different forms and should not be construed as limited to the embodiments set forth herein. Rather, these embodiments are provided as examples of how to implement the principles described in this invention.

GLOSSARY OF DEFINED TERMS

App—Application software

Checker—An agent of a Parking Authority who is responsible for validating the status (paid/unpaid, expired/unexpired) of a parking session for a given vehicle. In the literature, the person is also referred to as an Enforcement Officer (EO).

Checking Terminal—A handheld terminal used by the Checker to perform validation of parking sessions, or targeted enforcement, of parked vehicles.

Enforcement Officer (EO)—Used interchangeably with Checker.

Handset—Any wireless device, such as a cellular Handset, smartphone or personal data device, carried by a user and used to access the internet.

Parking Application Server—A server, operated by the Parking Service Provider, connected to the interne and running parking applications.

Parking Authority—An entity that owns a parking facility and collects fees for its use. Examples are municipal parking authorities and commercial parking garages.

User Platform—An electronic system including some or all of the following: positioning location subsystems, cellular radio modems, and radio modems for short range RF technologies such as RFID, where the electronic system supports a parking payment application. Examples are Handset and the electronic system of a vehicle.

Parking Service Provider (PSP)—A service provider providing parking payment and other value added services.

Parking Zone ID—An ID (typically a string of letters and numbers) used to identify a collection of parking spaces subject to a common tariff rate.

Payment Service Provider—An entity providing payment services to the Parking Service Provider. Examples are VISA, PayPal, banks.

Payment Server—Computing infrastructure of the Payment Service Provider.

Street Parking—Parking in any open area, where there is no access barrier to the available parking spots. This category includes both actual street parking and parking in open lots with no access control.

<.>—Delimiting symbols used to refer to an icon shown on a display screen, such as <Start Parking>.

FIGS. 1A-1F show a set of screen designs associated with one embodiment of the invention. The screens designs are for a Handset but can be adapted to a vehicular display, where the vehicle's electronic system has similar functions, or subsystems, as a Handset, including some or all of the following: a positioning subsystem comprising a satellite navigation system such as GPS, a cellular data modem, a short range wireless technology such as Bluetooth® and/or near field communications, or NFC. A vehicular electronic system may have additional functions not present in a Handset, such as a motion sensing inertial navigation system that helps to improve the position accuracy beyond that achievable by a satellite navigation system alone. The vehicular electronic system may also have an integrated RFID modem.

In the present application, the term User Platform is sometimes used to mean either a Handset or a vehicular electronic system, especially when the functions described could be performed by either. However, for specificity, some examples are provided in FIGS. 10A-10D and 11A-11C of how some of the use cases described below for a Handset could be adapted to a vehicular electronic system.

The usage scenario, or use case, illustrated in FIGS. 1A-1F involves a user parking in an open street and launching a parking App to Start a parking session. In modern Handsets, a common way to launch an App is to touch an icon on a touch sensitive display screen. An exemplary list of App icons is shown in FIG. 1A Handset Screen 0, including one for parking, "PSP," (where PSP is an example of a Parking Service Provider company name). In all examples in this invention disclosure, an icon selected by the user according to the narrative is shown shaded.

When the user selects, or touches, the PSP icon in Handset Screen 0 (FIG. 1A), which is shown as a root screen from which all Apps are launched in the examples described herein, the browser opens a subsequent page, where a number of parking options are displayed. As illustrated in FIG. 1B, Handset Screen 1, may be thought of as a root screen for parking Apps as well as the starting screen for a number of administrative options, such as Profile and Settings. It should be noted that the screen sequences described here are only examples of user interfaces for parking applications and that other designs are possible within the scope of the teachings of this disclosure.

For the present scenario, street parking, the user selects <Street Parking> on Screen 1, which leads (by browser action) to Handset Screen 2 (FIG. 1C). Here, the following may be displayed: (i) the vehicle's license plate (e.g. VA ABCD123), which may be sensed automatically as described below; (ii) the location of the user as indicated by the Handset's position location subsystem; (iii) option for the user to either accept the indicated location by selecting <Accept Location> or correct the indicated position by selecting, for example by touching, a different position on the display screen than the one indicated.

The position indicated by a Handset's position location subsystem is expected to be sufficiently accurate for parking operations in most environments. In such environments, with GPS unassisted by inertial navigation but assisted by other technologies such as knowledge of cellular base stations and Wi-Fi access points, an accuracy of 5-10 m is common. However, in dense urban canyons, owing to blockage of satellite signals and multipath propagation, the accuracy may be degraded beyond that acceptable for parking applications, such as introducing an ambiguity/error regarding the street the vehicle is on. An example of such an ambiguous indication is shown in FIG. 1C Handset Screen 2. When the User Platform is integrated into a vehicular electronic system, assistance to the GPS subsystem may be available from an inertial navigation system, which may increase the position accuracy to a level sufficient to enable parking in deep urban canyons without user corrections of the indicated position.

The selection of an alternate position may be performed in a variety of ways, including but not limited to, touching a selected location on a touch sensitive screen or moving a cursor to the selected location and pushing a button. In order to aid the user in gaining awareness of his whereabouts, the displayed map may indicate major landmarks, such as well known buildings and bridges, as well as street names.

The selection of <Accept Location> by the user on FIG. 1D Handset Screen 3 sends a message over a cellular data link to the Parking Application Server indicating that a Handset of specified ID and location, wishes to initiate a street parking session. The Server authenticates the user and sends information back to the Handset about the current parking rates and restrictions at the stated location. This information is referred to as the parking terms and conditions. An example thereof is displayed in FIG. 1E Handset Screen 4, which also shows a screen allowing the user to enter a pre-committed amount of parking session time.

Whether the user is required to purchase a pre-committed amount of session time at the start of the session, or whether he is allowed to pay only for the actual amount of consumed session time at the end of the session, is largely driven by the parking authority's policy. Even when purchase of pre-committed session time is mandated by policy, most parking authorities allow remote extension of session time by the user using his Handset. In the present system, in the case of pre-committed session time, a user experience corresponding to post-session payment of consumed session time is created by automatic (without user action) renewal of the session by the Parking Application Server in small time quanta agreed to by the user. This relieves the user of having to manually perform remote session extensions, which may be difficult if he is in a meeting or out of cellular coverage. It also ensures that his excess payment, relative to a pure post-session payment system, is a fraction of the auto-renewal time quantum. This is discussed further with respect to FIG. 12.

If the user has chosen the auto-renewal option of the present system, the requirement to enter the pre-committed session time, illustrated in FIG. 1E, is redundant. The screen may show that "auto-renewal" mode is on, and the user is simply required to select <Continue>. It may be recalled that reducing the number of user inputs and thereby improving the user experience is one advantage of the present system.

In a variation of the embodiment described above, information about the parking terms and conditions may be stored in the Handset. This avoids the exchange of a cellular data link message between the Handset and the Parking Application Server corresponding to the request and downloading of the parking rates and restriction information, and thereby reduces the process latency but may increase the storage requirement on the Handset. The choice of a particular embodiment is a matter of design choice. If the parking terms and conditions are dynamic, as is increasingly being preferred by many parking authorities, changes to the above terms and conditions may be pushed out to all Handsets subscribing to the parking payment service and located in the geographic areas covered by the terms and conditions.

Handset Screen 4 allows the user to cancel the transaction if, for example, the rates and restrictions are deemed unacceptable. This feature may increase in importance in the future as the present trend is for Parking Authorities to move to dynamic rates that change with parking spot occupancy levels. The user may choose not to park at the present location after reviewing the rates and restrictions.

The user's commitment to park at the selected spot occurs when he selects <Continue> on Handset Screen 4 (FIG. 1E). This leads to a request/confirm, cellular data transaction with the Parking Application Server, responsive to which FIG. 1F Handset Screen 5 is displayed, which is the last screen of this embodiment of the Start Parking process. The screen shows the session Start time, the scheduled End time (for pre-committed session times), the vehicle ID (license plate number), and the vehicle's location (which may provide an additional user benefit in helping him to locate the vehicle on his return). This screen comprises and example of an Active Session status screen, which the user may view remotely on his Handset at all times until the session has ended.

FIG. 2 shows a transaction ladder diagram corresponding to the above described steps. The diagram shows the sequence of steps in the time domain, including the points at which cellular data link transactions occur with the Parking Application Server. Both in this example as well as all others in this disclosure, a dotted line is used to indicate a causal connection between two actions; i.e. the action at the start of the arrow leads to the action to which the arrow is pointing. It will be noted that the latency of the entire process is typically determined largely by the two cellular data link transactions for communication with the Parking Application Server; the other steps are local to the Handset. That is, the other steps are taken by the browser in response to user inputs and without any external communications. In cases where the parking rate information is not subject to dynamic changes and is advertised to the user through legacy methods, or is sent to the user via push messages outside the present transactions as described above, or is otherwise known to the user, and/or the information is stored in the Handset as suggested above as an alternative embodiment, the action of requesting and downloading the parking rate/restriction information may be deleted to shorten the overall latency of the process.

FIGS. 3A-3D show Handset Screens corresponding to the methods of the present system. Launching the parking payment App by selecting <PSP> in Handset Screen 0 and <Street Parking> in Handset Screen 1, with an active session, takes the user to the Active Session screen shown in FIG. 3C. This screen may be stored in the Handset or fetched from the Parking Application Server. The former saves a cellular data transaction and may be preferred. The Active Session screen shows the location of the parked vehicle, which may aid the user to find the vehicle, and the amount of accrued charge—it may be viewed by the user at any time, even when he is not about to end the session. When the user desires to end the session, he selects <End Parking> on the Active Session screen. This causes a message to be sent from the Handset to the Parking Application Server that the user wishes to end the session. A final, receipt message is sent back from the server to the Handset, an example of the contents of the message being shown in FIG. 3D Handset Screen 3. The user may be offered the option of saving the receipt message in the Handset's memory.

Figure 4:
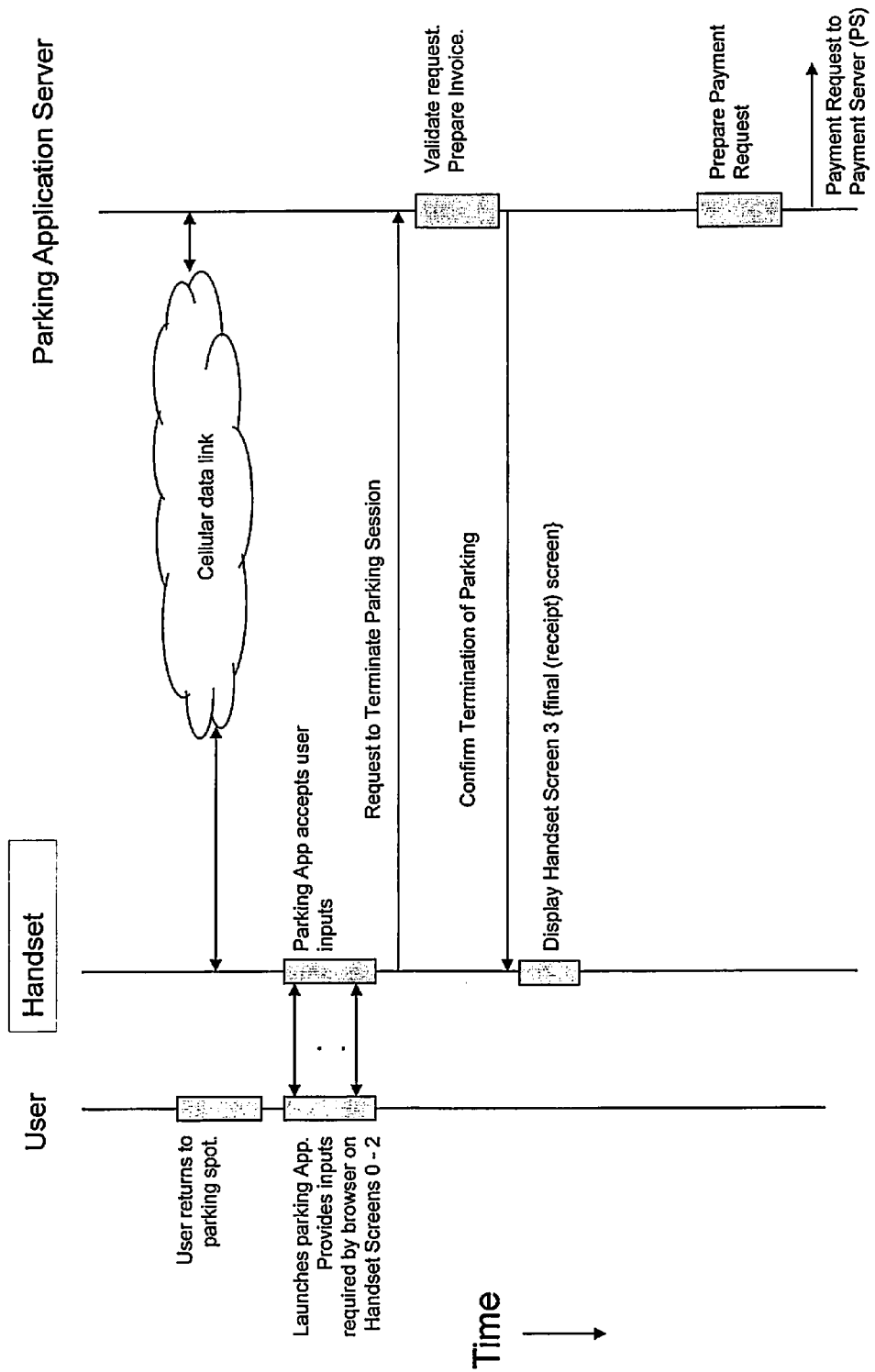
FIG. 4 shows a time-domain transaction ladder diagram corresponding to the use case of FIGS. 3A-3D.

The transaction ladder diagram for End Parking in the Street Parking case is shown in FIG. 4. As in FIG. 2, the diagram shows the sequence of steps in the time domain, including the point at which a cellular data link transaction occurs with the Parking Application Server.

Effecting session closure is given importance in the present system owing to the checking (targeted enforcement) benefits derived from knowing clearly whether a car with an active session is still parked. Without this knowledge it is not possible to unambiguously identify vehicles with expired sessions. Therefore, the present system has the ability to automatically cause session closure.

A session is closed automatically when it has been determined that a vehicle has been moved from its parked location. This determination is made by detecting movement of the vehicle based on (a) the change in the mean position of the vehicle exceeding a predetermined threshold, and/or (b) the speed of the vehicle, as reported by the positioning subsystem in the User Platform, exceeding a predetermined threshold. When the User Platform comprises the positioning subsystem built into the vehicle's electronics, that is, tied to the vehicle, the position reported by the User Platform may be taken to be that of the vehicle; hence session closure can be based exclusively on the reported mean position and time-rate of change of the above mean position. Note that the mean position, averaged over a selected time period (such as 2-10 s, such as 5 s) is used in the above method, instead of the instantaneous position. This is because the instantaneous position reported by a satellite navigation system, such as GPS, can experience small variations with time owing to multipath, changes in satellites' orbital positions and other factors.

When the User Platform comprises a Handset, the platform is not necessarily tied to the vehicle. Therefore, session closure cannot be based exclusively on the mean position and its time rate of change, as reported by the positioning subsystem in the Handset. However, position related information and the above method can still be used if it is known, a priori, that the user is in the vehicle. In the present embodiment of the system, this is established by conditioning the automatic session closure decision on the Handset receiving a short range beacon signal emitted by an identification device kept in/on the vehicle.

In summary, in the case when the User Platform is a Handset, the session may be closed automatically provided: the Handset is determined to be in the vehicle by virtue of receiving a beacon emitted by an identification device in/on the vehicle, AND either or both of the following conditions are met: (a) the mean position reported by the Handset's positioning subsystem, averaged over a predetermined time period, exceeds a predetermined threshold value; (b) the time rate of change of the above mean position exceeds a threshold value.

FIGS. 5A-5C shows an example of a screen for a Checking Terminal according to an embodiment of the methods and systems herein. The Parking Application Server has knowledge of the locations of all parked vehicles with active (unexpired) and expired sessions. There may be a small uncertainty about whether vehicles with active (unexpired) status are still parked, as discussed further below.

In the example of FIGS. 5A-5C, the Checker has decided on a particular area that he is going to survey for checking, or targeted enforcement. In one embodiment, the area may be selected unilaterally by the Checker depending on his work plan, which may be influenced by considerations other than the highest density of vehicles with expired sessions subscribing to a particular Parking Service Provider. In this embodiment, the Checking Terminal sends a message to the Parking Application Server, using a cellular data link, requesting information about the parked locations, session status and attributes of subscribing vehicles in the specified targeted enforcement area. The request may also include the Checker's present location. The Checking Terminal allows the Checker to select a target area and to send a message with the information described above. FIG. 5A Screen 1 shows an example of a selected area on such a map. Selecting <Enter> causes the request message to be sent to the Parking Application Server.

In an alternative embodiment, the Checker may request an advisement about the area to survey. This approach may be preferable when most parked vehicles are subscribers to the subject parking payment system, or it is advantageous to check such vehicles separately from other vehicles. In this case, the Checker sends a message to the Parking Application Server, using a cellular data link, requesting advisement on a target area; the request may include the Checker's present location. Responsive to the above request, the Parking Application Server downloads to the Checking Terminal, using a cellular data link, a recommended target area and the parked locations, session status and attributes of subscribing vehicle in the specified area. The area may include the Checker's present location.

Responsive to the receipt of the request message from the Checking Terminal, following either of the above methods for selecting the target area, the Parking Application Server downloads to the Checking Terminal the requested information using a cellular data link. The information may be displayed to the user as shown in FIG. 5B, Screen 2. The location of each vehicle subscribing to the subject parking payment service is shown as an icon, such as a dot, with a distinguishing feature such as color or shape to indicate its session status. In the example shown, the green dots 2 represent vehicles with unexpired sessions and the red dots 4 represent vehicles with expired sessions (as expected by the Parking Application Server). If information about session closure is less than absolutely certain, then the status of the red dots would be better described as "expected expired". This means that there would be a non-zero probability that an indicated vehicle with expired session had left the spot—it may not be found by the Checker at the time of checking. This shows the value of session closure in the checking process. Even with the use of automatic session closure, as described in this system, there is a non-zero possibility that, in some cases, the session closure process may fail because the Handset was switched off or lost. Owing to such error conditions, the certainty of finding a vehicle with an indicated expired session status may be less than 100%.

Detailed attributes of vehicles represented by each icon may be blown up and displayed by selecting an icon and requesting more information thereof. In the example of Screen 2 (FIG. 5B), such selecting may be performed by moving a cursor 6 over the icon and selecting <Enter>. Other means of item selection on a displayed screen, well known in the prior art, may also be used.

An example of the detailed attributes is shown in FIG. 5C, Screen 3. Examples of key information are the vehicle license plate number and session information, such as status (unexpired, expired), start time, end time and overage relative to present time. This information may be supplemented by an image of the vehicle, if available and the approximate street location.

The method/system described above of identifying a target area for enforcement, wirelessly downloading information about the identities and parking session status of vehicles parked in the target area, and displaying the information on a Checking Terminal in a way so as to facilitate checking, or enforcement, may be applied to other wireless parking payment systems, using other methods of identifying a vehicle's parked locations, such as zone IDs. In such cases, the indicated vehicle locations may be less precise than in the system described here, such as covering an entire city block. Nevertheless, the systems/methods taught here could still benefit such systems and lead to a reduction of enforcement effort.

Determining Vehicle ID with RFID During Targeted Enforcement

Figure 6:
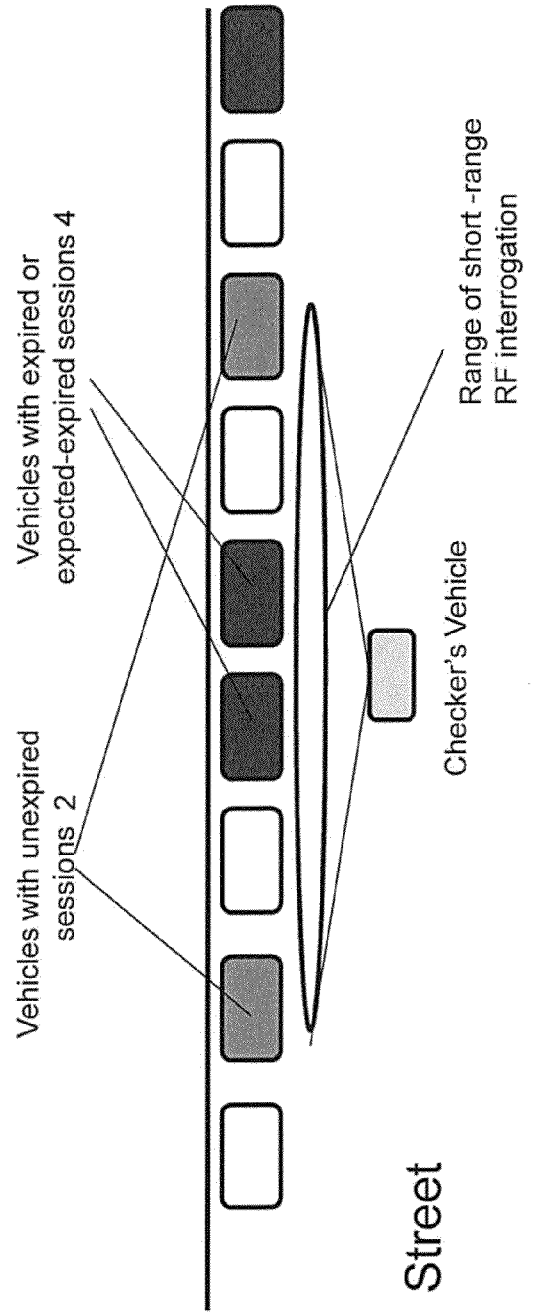
FIG. 6 illustrates how short range wireless validation of parked vehicles, based on RF query/response, may be performed according to the methods/systems described in the present invention.

FIG. 6 shows an example of performing parking session validation (targeted enforcement) according to the principles taught in this invention. All vehicles participating in the present system are preferably equipped with a short range wireless transponder, or tag, with a range such as 10 m, similar to RFID devices used for highway toll collection. The Checking Terminal is equipped with an RF interrogator that can communicate with the tags. According to methods of RF transponder interrogation known in the art, the interrogator issues a series of interrogations, or queries, as it drives slowly past the targeted parked vehicles. The time-rate at which the queries are issued may be controlled by the Checker and will depend on the speed of the drive-by vehicle. The tags in the vehicle respond to the queries according to the rules of a chosen protocol, such as one which has the ability to resolve potentially colliding responses from a multiplicity of tags, such as specified in ISO18000-C.

The responses from the tags contain the vehicle IDs. These responded IDs are compared by the software in the Checking Terminal for matches with the downloaded IDs of subscriber vehicles located at that targeted area. Not all expired vehicles may be physically present, for the reasons described above. Therefore, the vehicles (physically present at the targeted location) which may be ticketed may be a subset of vehicles with expired status, according to the information downloaded to the Checker's Terminal from the Parking Application Server. Based on these matches (between the RFID responses and downloaded information) and assisted by the attributes of the vehicles such as license plate number and image displayed on the Checking Terminal, the Checker identifies the physical vehicles for enforcement.

Determining Vehicle ID with RF Beacon During Targeted Enforcement

Figure 7:
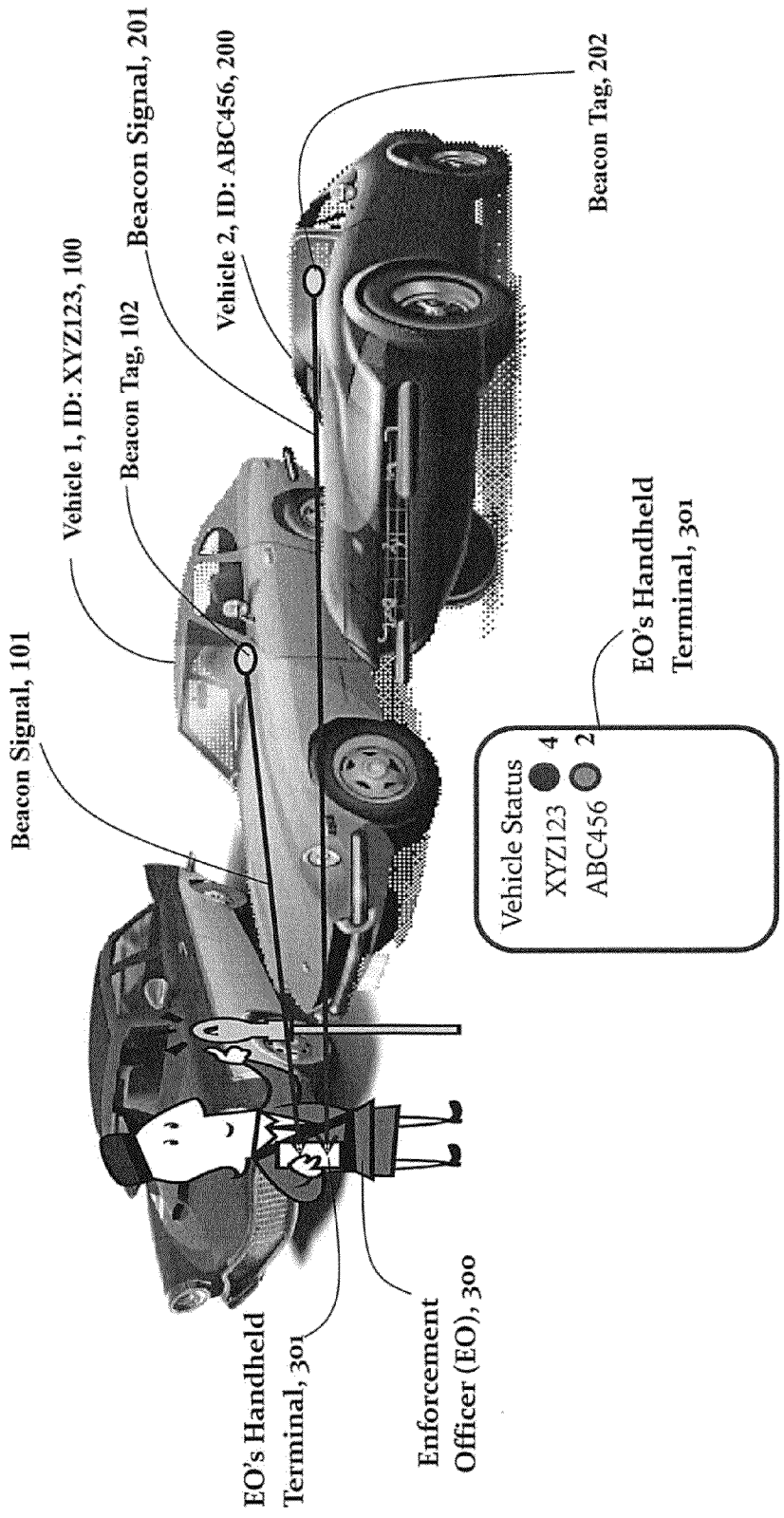
FIG. 7 illustrates how short range wireless validation of parked vehicles, based on RF beacons, may be performed according to the methods/systems described in the present invention.

FIG. 7 illustrates an alternate embodiment of short range wireless validation of parked vehicles using an RF beacon emitted by a tag located in/on the vehicle. The figure shows a Checker, or Enforcement Officer (EO), 300, with a handheld Checker's Terminal, 301, which is responsive to (or senses) a beacon 101 when it is within coverage range of the signal, that is, the Checker's Terminal receives the beacon signals 101, demodulates them and displays the transmitted application data on the terminal's display. The beacon signals, 101 and 201, are emitted by an identification devices, such as a tags 102 and 202 respectively, located in/on the vehicles 100 and 200 respectively. Unlike an RFID tag, the beacon tags emits their signals unilaterally, that is without being prompted by a query from the Checker's Terminal. Typically, the beacon signals are transmitted periodically with a predetermined periodicity. If a particular beacon emitter, or tag, is always associated with a particular vehicle, for example by keeping the tag permanently in/on the vehicle, the tag ID can serve as a proxy for the vehicle ID. An example of such a beacon signal known in the prior art is Bluetooth® Low Energy, also known as BLE.

In the walk-around validation method according to this embodiment, the Checker, or Enforcement Officer, gets sufficiently close to vehicles 100 and 200 of the present system such that his handheld Checker's Terminal 301 will be able to sense the beacon signals 101 and 201 that are autonomously and periodically transmitted by the tags 102 and 202, respectively. The beacon transmitters in the tags, 102 and 202, carry identification information as application data, which may be related to the respective vehicles, 100 and 200, or to the identification devices, or tags, themselves. In the former case, the vehicle identity may be read directly from the beacon signals. In the latter case, a short information exchange with the identification device is required to determine the vehicles' identities.

One embodiment of this method comprises a Bluetooth® Low Energy (LE) device transmitting in the advertising mode of the Bluetooth® LE protocol. According to this protocol, once the receiver of the beacon signal—that is, the Checker's Terminal 301—senses the presence of the beacon transmitters in tags 102 and 202, it holds a short data exchange transaction with the tag transmitters to gather information from the transmitters. In the present application, this information would be the vehicle IDs.

The beacon transmitters would also serve the purpose of vehicle ID recognition by a Handset carried by the user, as described above and in U.S. patent application Ser. No. 13/862,619. Advantages of this approach over the use of RFID are that (a) an additional RFID tag is not required to be placed in/on the vehicle, and (b) no RFID query module is required in the Checker's Terminal. As RFID query devices consume more power than a device using other short range technologies, such as BLE, it is desirable to avoid incorporating an RFID query device in a handheld terminal, if possible. Moreover, the main advantage of RFID checking is that it enables drive-by validation. As walk-around validation is likely to be required for many years to accommodate legacy parking payment systems, the advantage of RFID validation over beacon based validation may remain unrealized for many years.

Information about the session status of parked vehicles in the targeted geographic area, as well as vehicle attributes, have already been downloaded to the Checker's Terminal 301 from the Parking Application Server, in the same way as described above for checking with RFID. Software in the Checker's Terminal 301 checks the session status of vehicles whose beacon it can sense and provides an indication if a vehicle is deemed to have expired session status. In the example of FIG. 7, the IDs of vehicles with readable beacons are displayed on the Checker's Terminal 300 with red 4 or green 2 dot to indicate expired and unexpired status, respectively.

The example described above and illustrated in FIG. 7 is one of many possible embodiments of the basic method taught here, which comprises checking the parking session status of a parked vehicle using a short range beacon and downloaded information from a server. This involves less effort than present methods, which involve scanning license plates of all cars that appear to be parked illegally, uploading the information to a server and obtaining a reading back from the server on whether (a) the vehicle belongs to a particular pay-by-cell service, and (b) if so, if its session has expired.

Vehicle Recognition by Handset Using Other Methods

In the present system, an identification device is kept in/on the vehicle and may be used for several purposes, including (i) identifying the vehicle to the Handset, (ii) automatic session closure and (iii) vehicle identification by the Checker, or EO, for session status checking, or enforcement. These applications may be served by a common short range beacon signal, such as BLE, as mentioned above. However, other alternatives are possible for (i). These include the use of optical scanning of a pattern or code printed on a physical tag in/on the vehicle and near field communications (NFC) involving an NFC tag placed in/on the vehicle.

Figure 8:
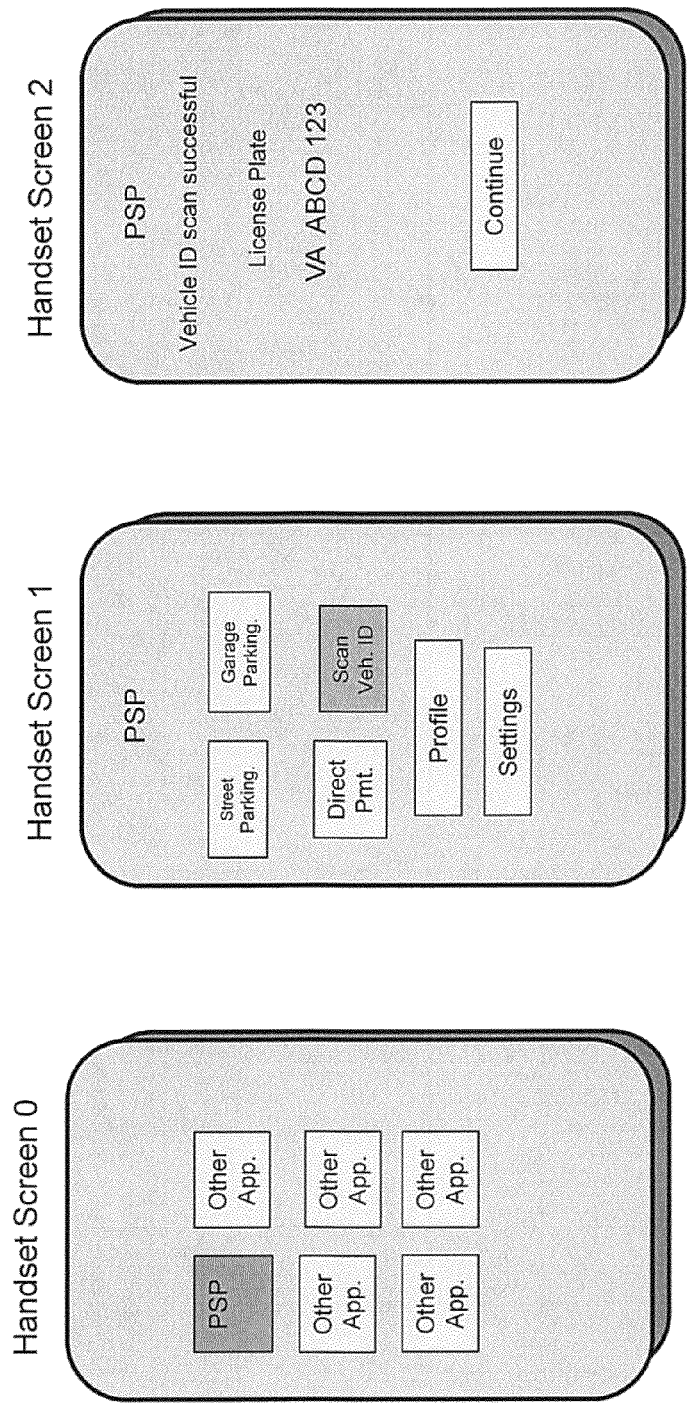
FIGS. 8A-8C show Handset screens for vehicle ID sensing by a Handset using optical scanning.
Figure 9:
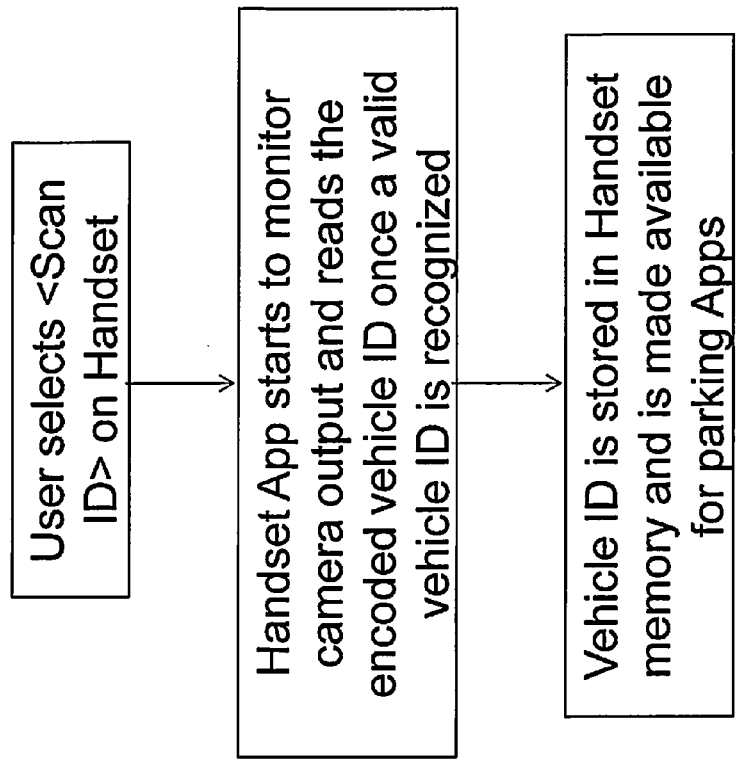
FIG. 9 is a flow diagram showing the operational steps involved in vehicle ID sensing by a Handset using optical scanning.

FIGS. 8A-8C illustrate Handset screens for a method/system for a Handset to automatically sense a vehicle ID by optical scanning. After selecting the parking App, <PSP>, on FIG. 8A Handset Screen 0, the user selects the optical scanning application by selecting <Scan Vehicle ID> on Handset Screen 1 (FIG. 8B). This activates the Handset's camera and a Handset application which analyzes the data from the camera for a match with a valid vehicle ID pattern. If a match is found, the vehicle's license plate number is displayed, as on FIG. 8C Handset Screen 2, and stored in the Handset memory for use by parking applications. The user selects <Continue> to return to the root screen. FIG. 9 shows a flow diagram of the steps involved in the process.

Automatic sensing of the vehicle ID may also be performed by other sensor technologies, such as near field communications (NFC) and Bluetooth®.

NFC may be used by locating a passive NFC tag in the car and bringing a Handset supporting NFC within coverage range (few centimeters) of the tag. The sensing of the tag automatically starts an App which can be programmed to accept the responded vehicle ID and overwrite the previous one (if one exists) in the data memory accessed by the parking applications described here.

Bluetooth® may be used by either using the Bluetooth® function provided as a part of the vehicle's built in electronic system or a low power Bluetooth® tag, such as a BLE tag, placed in the vehicle. Bluetooth® paring of a vehicle's electronic system and a Handset are commonplace in modern vehicles. The vehicle's ID for parking applications may be linked to the Bluetooth® ID used in such pairing. Low power Bluetooth® (BLE) tags have been used to track personal items and pets. Such tags may also be used in lieu of the vehicle's native Bluetooth® system. An advantage of using Bluetooth® over other sensor methods is that the vehicle ID sensing is automatic when the user enters the vehicle, i.e. transparent to the user, requiring no action on his part. A further advantage of using BLE over the native (built-in) Bluetooth® system of a vehicle is that the time required for sensing a BLE signal and performing a short data exchange with it is shorter than the standard Bluetooth® pairing protocol.

Parking App Built into Vehicle Electronics

FIGS. 10A-10D shows how a street parking (Start Parking) App may be supported on a vehicular electronic system, based on adaptations of Handset screens. On the root screen, FIG. 10A Vehicle Display Screen 0, the user launches the parking App by selecting <Parking>. This sends a session initiation request message to the Parking Application Server via a cellular data link. The message contains the vehicle's ID and its position, indicated by its position location subsystem. As in the Handset case, it is possible to add another screen to allow the user to correct the indicated position, and such embodiments are covered by the methods/systems taught in this invention, although not shown in FIGS. 10A-10D. However, such correction is less likely to be necessary when the User Platform is integrated into the vehicle's electronic system, as positioning assistance may be available from the vehicle's inertial navigation system which may obviate the necessity for correction.

Figure 10A:
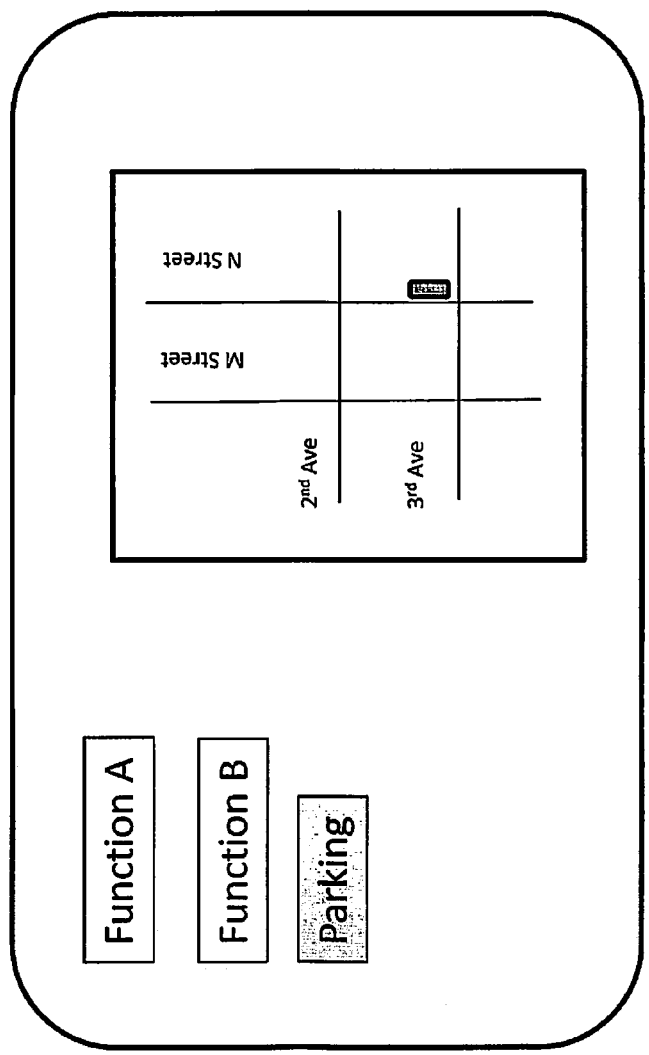
FIGS. 10A-10D show examples of a vehicular display screen for Start Parking in open streets when the User Platform is integrated into the vehicle's electronic system.
Figure 10B:
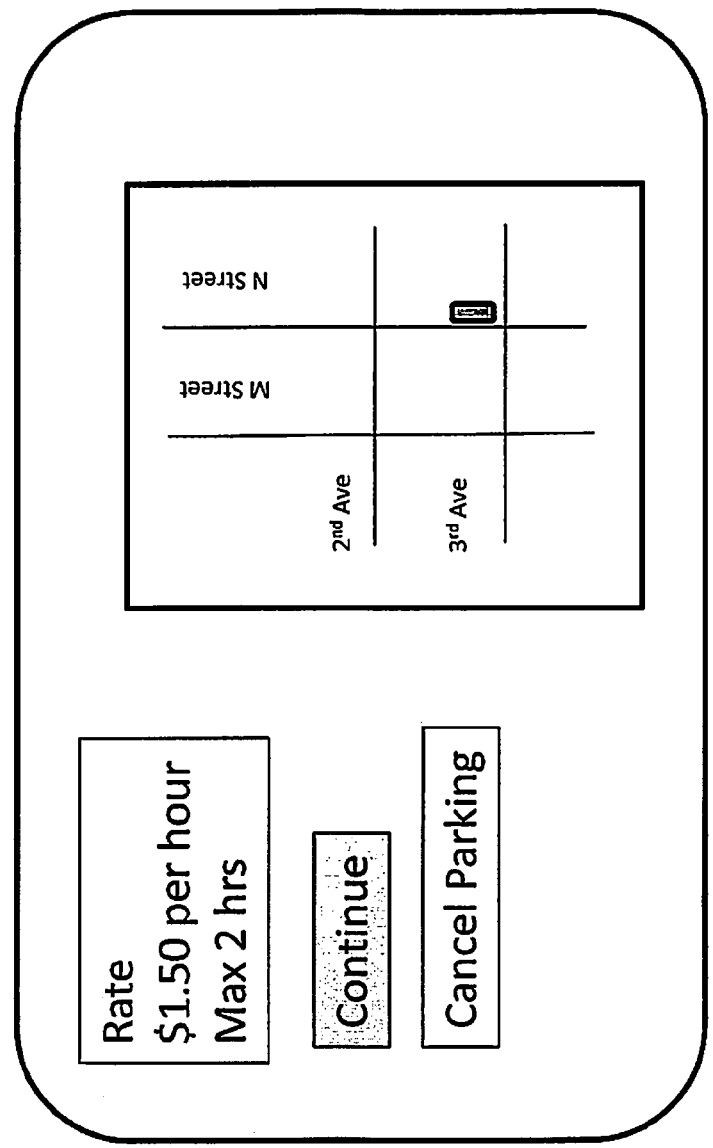

The Parking Application Server responds with the parking terms and conditions information, which are displayed in FIG. 10B Vehicle Display Screen 1. If the terms and conditions are acceptable, the user selects <Continue>; if not, he selects <Cancel Parking>. Assuming that he selects the former, the next screen, FIG. 10C Vehicle Display Screen 2, requests the user to enter a committed parking session time, assuming that a pre-committed session is required by parking policy. The browser may skip this step based on the vehicle's location and stored knowledge of the policy of the local Parking Authority, or the if user has selected the auto-renewal option of the present system.

Figure 10C:
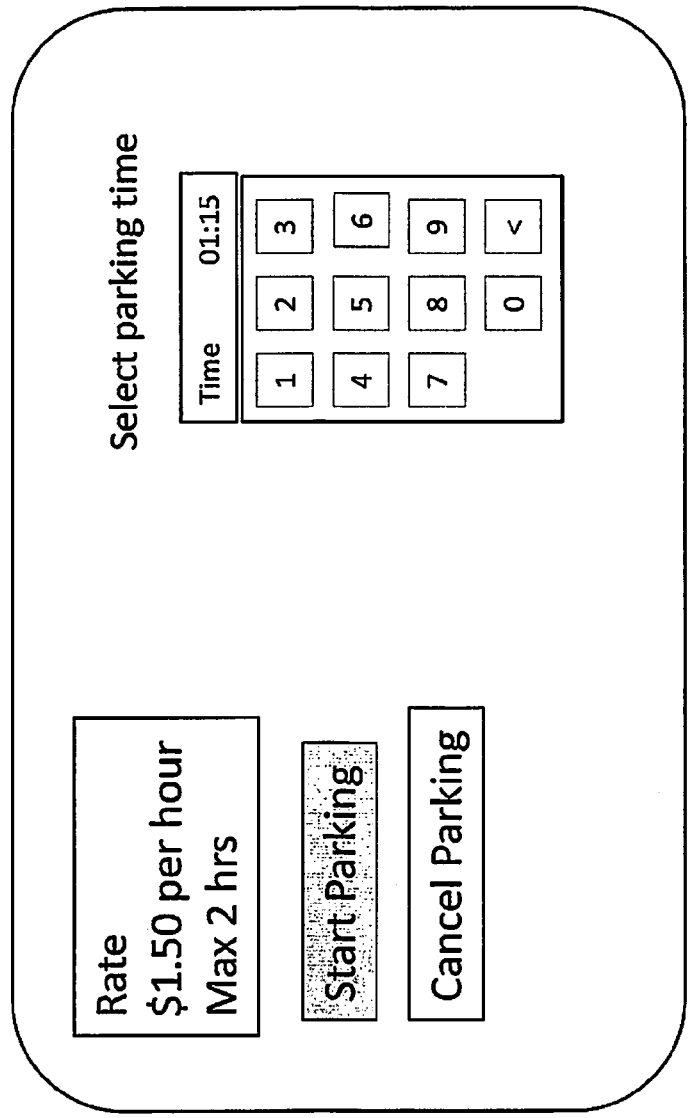
Figure 10D:
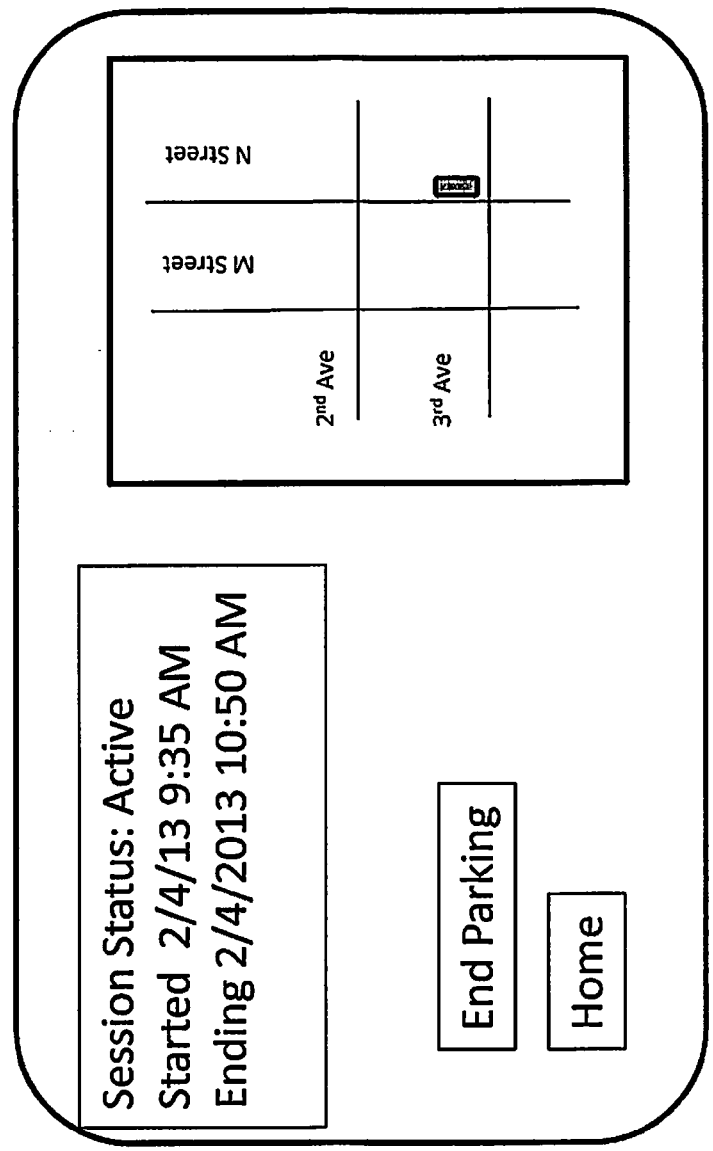

Following the entering of committed parking session time in FIG. 10C Vehicle Display Screen 2, the user selects <Start Parking>. This sends a message to the Parking Application Server, which causes a parking session to be started at the server and a confirmatory Active Session status screen is returned to the User Platform, which is displayed as FIG. 10D Vehicle Display Screen 3. This screen may be different if auto-renewal is selected—there may be no entry under Ending Time and the choice of "auto-renewal" may be displayed. The user may exit the parking App and return to the root screen, Screen 0 (FIG. 10A), by selecting <Home> on this screen.

If Screen 2 (FIG. 10C) were deleted as described above and no user correction of the indicated position were required, which is likely when the User Platform is integrated into the vehicle, the number of user steps required to complete the Start Parking process would be reduced to two, comprising those in Screens 0 and 1 (FIGS. 10A, 10B). If the rate/restriction information were known through other means, the number of screens requiring user input could be reduced to one (Screen 0, FIG. 10A), leading to one-touch parking.

Figure 11B:
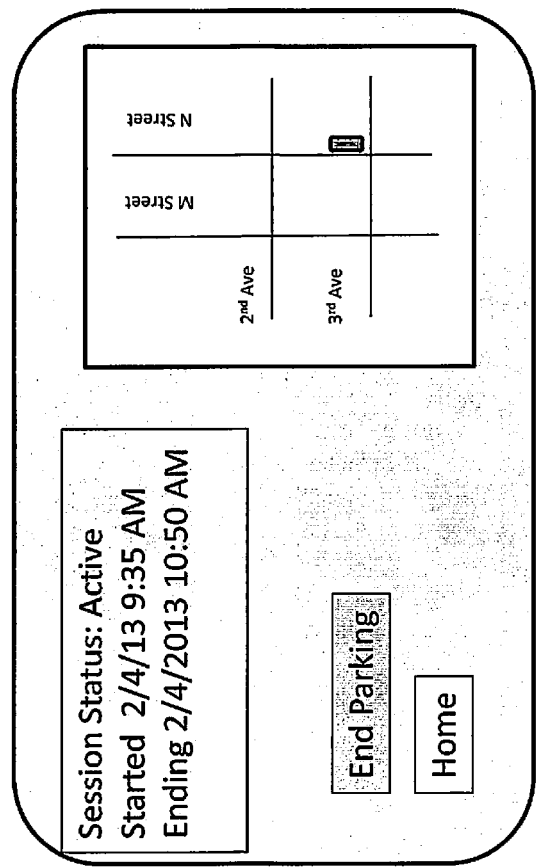
Figure 11C:
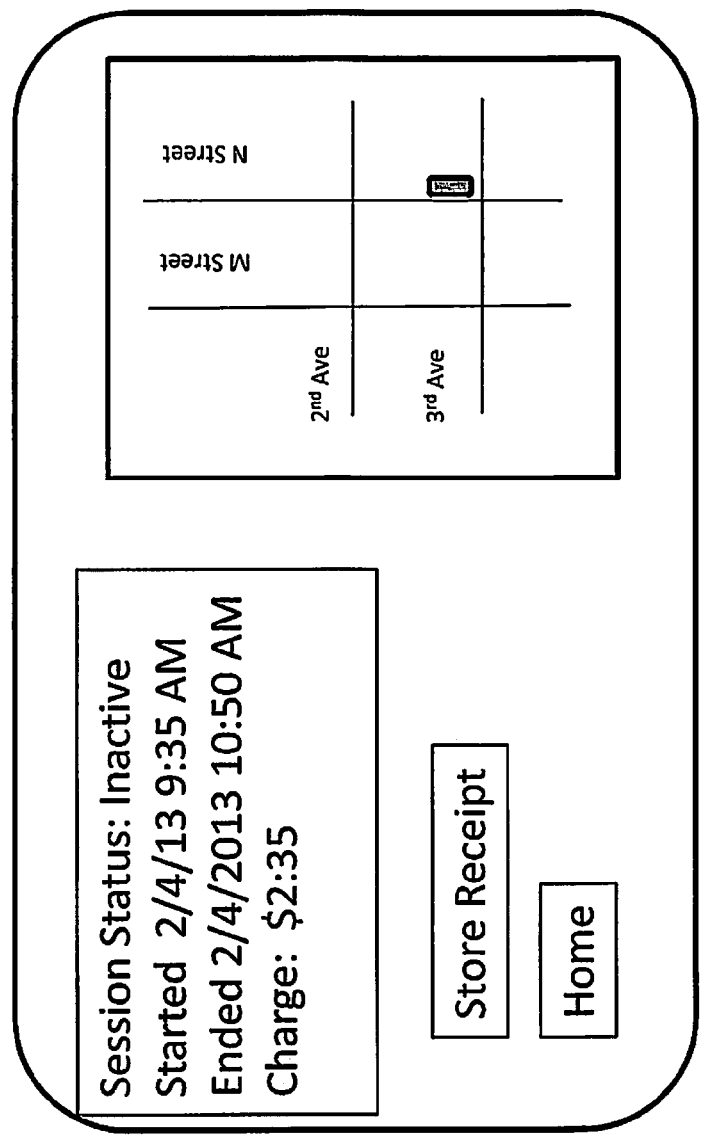

FIGS. 11A-11C show how the Street Parking (End Parking) use case can be executed from the vehicular electronic system. The user selects <Parking> in the root screen, FIG. 11A Vehicle Display Screen 0. As the session is known to be active, the browser opens the Active Session status screen, FIG. 11B Vehicle Display Screen 1. If auto-renewal has been selected, there may be no entry for line showing Ending Time and the choice of "auto-renewal" may be displayed. On this screen, the user selects <End Parking>. This sends a session closure request message to the Parking Application Server, which causes the session to be terminated by the Server and a confirmatory receipt screen, containing the session start and end times and the amount charged, to be returned to the User Platform. The user may store the receipt and/or return to the root screen by selecting <Store Receipt> and <Home> buttons, respectively, shown on the exemplary FIG. 11C Vehicle Display Screen 2.

Automatic Session Renewal

As described above, the policy of some parking authorities regarding on-street parking is that, at the onset of the parking session, the user must commit to a predetermined (prepaid) amount of session time. This policy may have been modeled on legacy, coin based meter parking, but it has negative consequences when extended to pay-by-cell parking payment. Negative consequences include: (i) the introduction of an additional step in the user's interaction with the device (Handset or built-in car app) which queries the user about the amount of prepaid time, requiring the user to enter this value and (ii) if the prepaid time is not fully used, this time is wasted as there is no precedence (in present parking policies) of allowing a refund for unused time. FIG. 1E shows a Handset screen that supports querying the user about the amount of prepaid time and allowing them to enter a value with a smartphone. FIG. 10C shows the car displays for the same purpose when the User Platform is built into a car's electronic system.

It has been described above that, in an embodiment of the present method, the parking session can be renewed automatically by the Parking Application Server without user action. This process is described below in more detail and illustrated with the flow diagram of FIG. 12. The user agrees in the subscription contract to an initial prepaid time of a small amount, such as a period between 5 and 15 minutes. Thereafter, the session time is automatically extended by the Parking Application Server in small quanta, such as 5 minutes, without additional user inputs. The automatic session time extension continues until one of the following limits is encountered: (a) the user closes the session; (b) a parking policy determined limit on the maximum session time (such as 2 hours) is reached; or (c) a free parking period ensues, such as after peak office periods in downtown areas.

Figure 12:
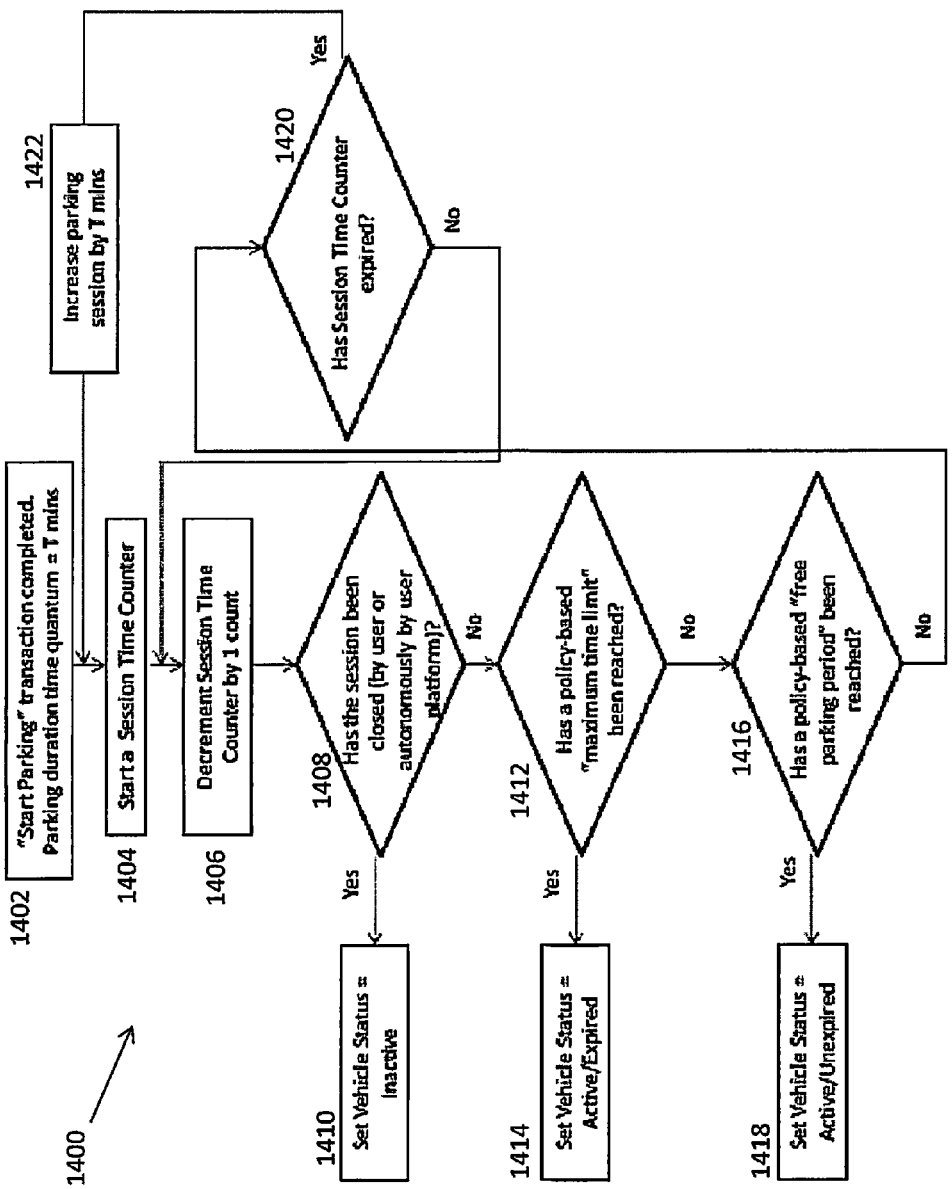
FIG. 12 is a flow diagram illustrating a method according to an embodiment enabling automatic session renewal.

In an aspect of this embodiment, at a number of fixed periods (e.g. 30 minutes and 10 minutes) before the maximum session time limit is reached, the user may be sent a warning that the session is about to reach a hard stop, beyond which it cannot be auto-renewed, thereby allowing the user an opportunity to return to the vehicle if possible. FIG. 12 is a flow diagram illustrating an embodiment of the above method. The method 1400 includes a first step 1402 of initiating the parking program with a first predetermined (prepaid) time duration. In the second step 1404, a session timer is started. The session timer is decremented in the third step 1406. In a first decision step 1408, the parking program asks if the parking session has been closed by the user or autonomously. If the answer is "yes," the vehicle status is set to inactive in step 1410. If the answer is "no," a second decision step 1412 inquires if a policy-based maximum time limit has been reached. If the answer is "yes," the vehicle status is set to active/expired in step 1414. If the answer is "no," a third decision step 1416 inquires if a policy-based free parking period has been reached. If the answer is "yes," the vehicle status is set to active/unexpired in step 1418. If the answer is "no," the session timer is queried in step 1420 to determine if the parking session has expired. If the answer is "yes," the parking session is increased by a second predetermined (prepaid) time duration in step 1422 and the session timer is reset in step 1404. If the answer is "no," the session timer is decremented in step 1406. The first through third decision steps 1408, 1412 and 1416 are shown in one particular order in FIG. 14. However, these steps do not have to be performed in the illustrated order. That is, steps 1408, 1412 and 1416 may be performed in any order. For example, in alternative embodiments, steps 1412 and 1416 may be performed before step 1408 and step 1416 may be performed before step 1412.

One-Touch Parking Payment

Figure 13A:
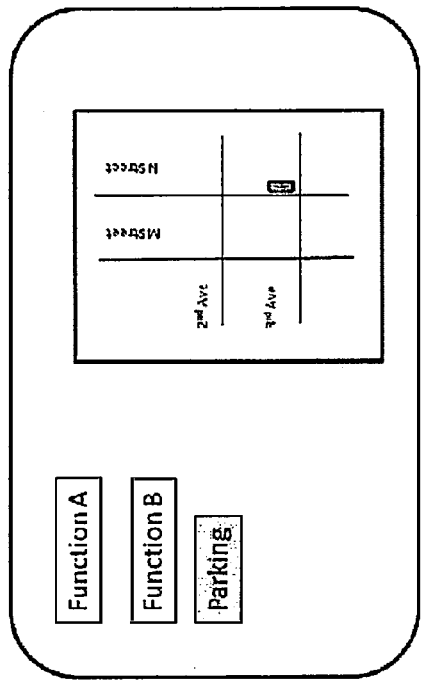
FIGS. 13A-13C show examples of vehicular display screens for implementing the method of FIG. 12.
Figure 13B:
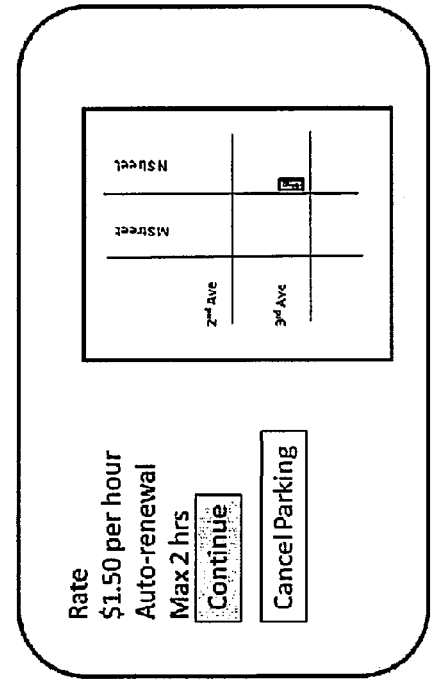
Figure 13C:
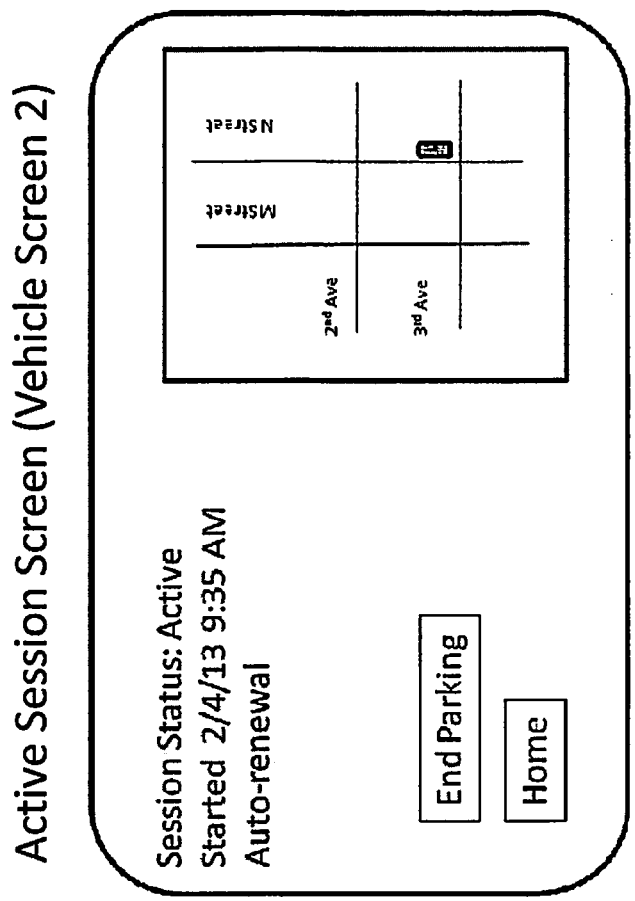

In an aspect of the above embodiments, the parking charges may be accumulated in the Parking Application Server until the session has been closed to avoid micro-charges to credit cards, which may result in a large relative overhead expense. The charges may be forwarded to the Payment Server subsequently. The elimination of the user step to enter a prepaid (pre-committed) amount makes it possible to offer "one touch parking payment" in the case where the parking payment app is built into the car's electronic system. This is shown in FIGS. 13B and 13C. Although three screens are shown (FIGS. 13A-13C), after opening the parking app (FIG. 13A), only a single user input (accepting the parking rate on Screen 1, FIG. 13B by selecting <Continue>) is required to start the parking session.

Figure 14C:
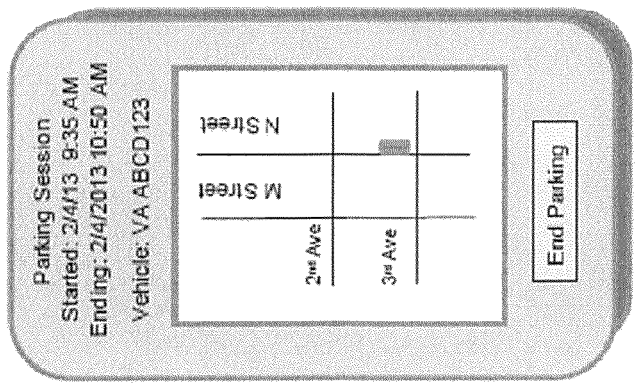
FIGS. 14A-14C show examples of Handset screens for a method of "one touch parking."
Figure 14B:
Figure 14A:
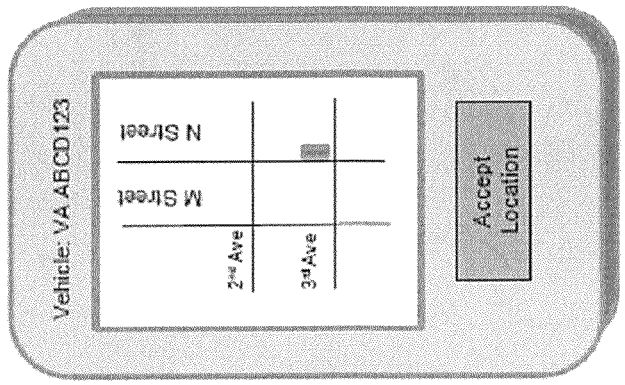

In the case of Handsets, one touch parking payment is also possible if the application is restricted to areas with a strong GPS signal and auto-renewal is used. This is shown in FIGS. 14A to 14C. The user correction screen of FIG. 14A can be eliminated if the GPS signal is strong and the position report stable. If auto-renewal is selected, then no user input of a pre-committed session time is necessary and the screen of FIG. 14B suffices. Thus, after opening the Street Parking app, the user only needs to select <Continue> on the screen of FIG. 14B to start the session.

The above described method of automatic session extension also provides the user a strong motivation to close an open session by engaging in an End Parking transaction before leaving the parked spot. Otherwise, the virtual session meter in the Parking Application Server will keep running until the maximum session time limit is reached.

Using Knowledge of Vehicle Parked Status to Monitor Level of Parking Spot Availability In an embodiment, the distribution of parked cars, as known by the Parking Application Server, may be shared with end users as an indication of parking spot availability. The implication is that unoccupied spots are potentially free (it is accepted that this indication will be wrong if the spot is occupied by a car using legacy parking payment means). This method of monitoring and reporting parking spot availability will become more accurate as pay-by-cell means of parking payment become more prevalent.

Using Information from Vehicle Electronics to Aid Parking Apps on Handset

Another embodiment is based on the recent trend for car manufacturers to support an open application programming interface (API) to allow access to various sensors in the car, including position reports from the car's built-in positioning subsystem. This API is designed to be compatible with major smartphone operating systems, such as iOS® and Android®. The objective is to promote third party involvement in the development of Apps for non-safety functions of the car. Not all car manufacturers may build cellular data modems, referred to in this application as User Platforms, into the cars. However, in this case, the API supports external data transfer to and from the car's electronic system via the user's smartphone. Thereby information from the vehicle's built-in electronic subsystems, such as the positioning subsystem, may be used by an App on the smartphone, or Handset, for parking payment and other applications.

Figure 15:
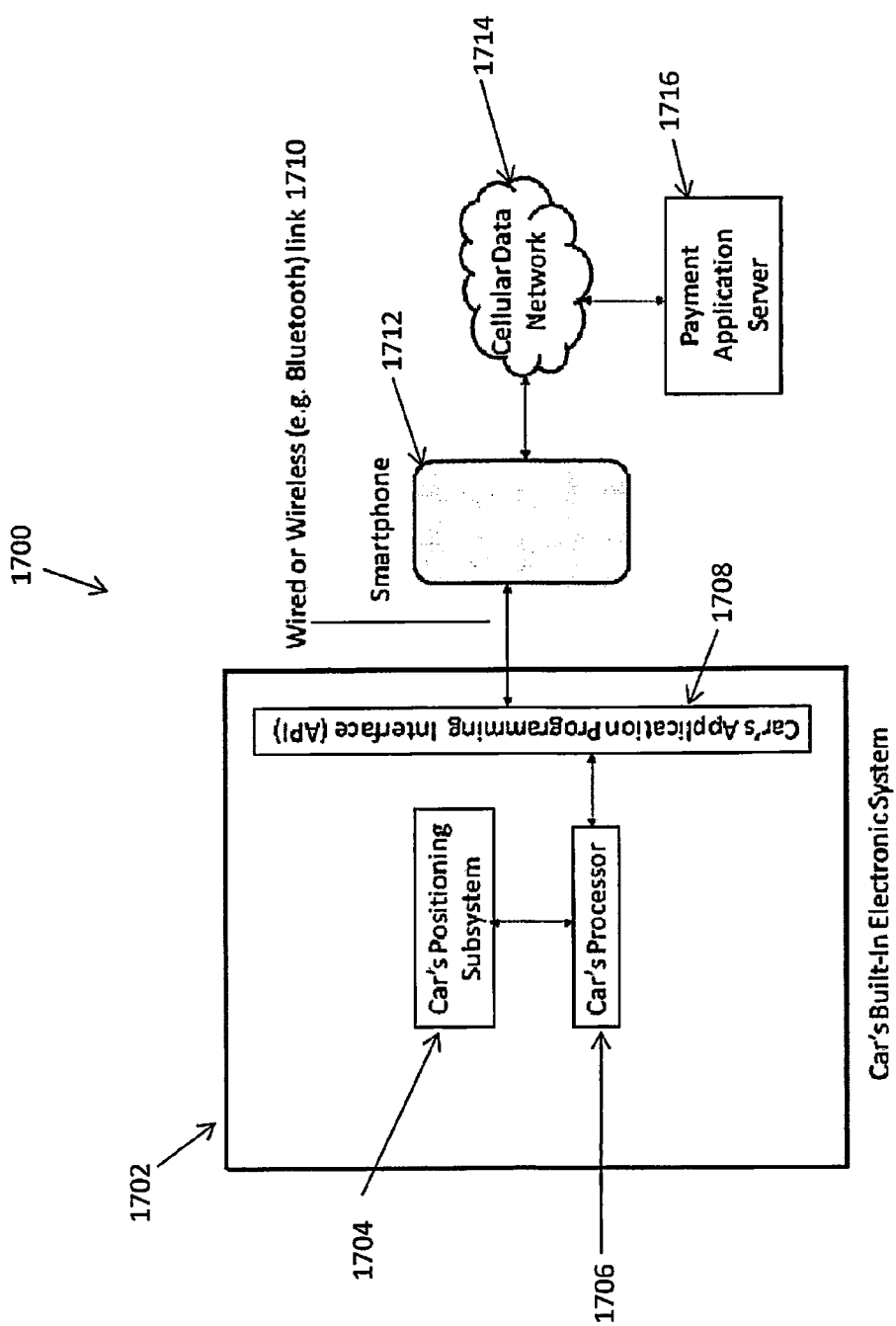
FIG. 15 is a schematic illustration of a parking system that uses a vehicle's built-in positioning a system to improve the positioning accuracy of a vehicle.

FIG. 15 is a schematic illustration of an API based system 1700 according to an embodiment. In this embodiment, the vehicle's built-in electronic system 1702 includes a positioning subsystem 1704 and a processor 1706. Positioning information may be passed to a smartphone 1712 from the positioning subsystem 1704 via the processor 1706 and the API 1708. The positioning information may then be passed from the smartphone 1712 to the payment application server 1716 via a cellular data network 1714. The link between the smartphone and the car's electronic system may be wired, such as an USB port, or wireless, such as Bluetooth®.

What is claimed is:

1. A method of payment for parking of a vehicle comprising:
    determining the location of the vehicle with a wireless communication device, wherein determining the location comprises using a satellite navigation system;
    initiating a parking session having a first prepaid time duration with a server;
    transmitting the location of the wireless communication device and an identity of the vehicle to the server; and
    automatically extending the parking session with subsequent prepaid time durations until the parking session automatically closes on detection of movement of the vehicle away from a parking spot,
    wherein automatic closure of the parking session on detection of movement of the vehicle away from a parking spot comprises detecting movement of the wireless communications device with the satellite navigation system and detecting if the wireless communication device is in the vehicle at the time at the time that the movement of the wireless communication device is detected, and wherein detecting that the wireless communication device is in the vehicle is performed by detecting that the wireless communication device is able to exchange information with an identification device in/on the vehicle using low energy communications protocols or short range communications protocols.

2. The method of claim 1, wherein a warning is sent prior to expiration of the parking session.

3. The method of claim 1, wherein parking charges for the first prepaid time duration and the subsequent prepaid time durations are accumulated in the server until the parking session is closed.

4. The method of claim 1, wherein a parking payment application is part of an electronic system of the vehicle and making a complete parking payment requires only a single user input following opening the parking payment application.

5. The method of claim 1, wherein a parking payment application is located on a Handset and the parking session is initiated subsequent to exchanging vehicle identity information by the Handset with the identification device in/on the vehicle.

6. The method of claim 1, where the wireless communications device comprises a Handset and wherein automatically closing the parking session on detection of movement of the vehicle away from a parking spot occurs when data has been exchanged between the low energy communications or short range communications device in/on the vehicle and the Handset.

7. The method of claim 1, where the wireless communications device comprises a Handset and information available from a vehicle's built-in subsystems, including a positioning subsystem, are accessed by the Handset via an application programming interface.

8. The method of claim 7, wherein accessing is performed wirelessly.

9. The method of claim 1, further comprising:
    providing a portable wireless identification device placed in the vehicle or a fixed wireless identification device built into the vehicle,
    automatically communicating a unique identification of the vehicle to the portable wireless device using a wireless technology which does not require any action on the part of the user beyond ensuring that the portable wireless device is switched on and within a coverage range of the wireless identification device.

10. The method of claim 9, where the wireless technology comprises a short range wireless technology and a broadcast communication protocol.

11. A system comprising:
    a wireless communications device providing user input and output and position location capability,
    and a server connected to the wireless communications device,
    wherein both the wireless communications device and the server are configured to pay for parking by:

determining the location of the vehicle with a wireless communication device, wherein determining the location comprises using a satellite navigation system;

initiating a parking session having a first prepaid time duration with a server;

transmitting the location of the wireless communication device and an identity of the vehicle to the server; and automatically extending the parking session with subsequent prepaid time durations until the parking session automatically closes on detection of movement of the vehicle away from a parking spot, wherein automatic closure of the parking session on detection of movement of the vehicle away from a parking spot comprises detecting movement of the wireless communications device with the satellite navigation system and detecting if the wireless communication device is in the vehicle at the time at the time that the movement of the wireless communication device is detected, and where detecting that the wireless communication device is in the vehicle is performed by detecting that the wireless communication device is able to exchange information with an identification device in/on the vehicle using low energy communications protocols or short range communications protocols.

12. The system of claim 10, further comprising a Handset, wherein the parking session is initiated subsequent to the Handset exchanging information with the identification device in the vehicle and the parking session is closed automatically on detection of movement of the vehicle away from a parking spot subsequent to the Handset exchanging information with the identification device in the vehicle.

13. The system of claim 11, wherein the vehicle comprises a parking application that is part of an electronic system of the vehicle and making a complete parking payment requires only a single user input following opening the parking payment application.

14. The system of claim 11, further comprising a built-in positioning system in the vehicle.

15. The system of claim 14, further comprising an application programming interface allowing access of a parking application to the built-in positioning system.

* * * * *